(12) United States Patent
Uchimura

(10) Patent No.: US 11,245,941 B2
(45) Date of Patent: Feb. 8, 2022

(54) INFORMATION PROCESSING APPARATUS, INFORMATION PROCESSING METHOD, RECORDING MEDIUM, PLAYBACK APPARATUS, PLAYBACK METHOD, AND PROGRAM

(71) Applicant: SONY CORPORATION, Tokyo (JP)

(72) Inventor: Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/762,738

(22) PCT Filed: Nov. 2, 2018

(86) PCT No.: PCT/JP2018/040789
§ 371 (c)(1),
(2) Date: May 8, 2020

(87) PCT Pub. No.: WO2019/098054
PCT Pub. Date: May 23, 2019

(65) Prior Publication Data
US 2021/0176508 A1    Jun. 10, 2021

(30) Foreign Application Priority Data
Nov. 17, 2017  (JP) .............................. JP2017-221549

(51) Int. Cl.
*H04N 21/236* (2011.01)
*H04N 19/85* (2014.01)
(Continued)

(52) U.S. Cl.
CPC ....... *H04N 21/23614* (2013.01); *G11B 27/30* (2013.01); *H04N 19/85* (2014.11);
(Continued)

(58) Field of Classification Search
None
See application file for complete search history.

(56) References Cited

U.S. PATENT DOCUMENTS

2011/0314174 A1* 12/2011 Joung .............. H04N 21/85406
709/231
2016/0205338 A1*  7/2016 Kozuka .................... H04N 5/57
348/687
(Continued)

FOREIGN PATENT DOCUMENTS

CN        103583045 A       2/2014
CN        105284106 A       1/2016
(Continued)

*Primary Examiner* — James R Marandi
(74) *Attorney, Agent, or Firm* — Paratus Law Group, PLLC

(57) ABSTRACT

There is provided an information processing apparatus, an information processing method, a recording medium, a playback apparatus, a playback method, and a program that are designed to prevent an unnatural change in luminance during random access. The information processing apparatus according to one aspect of the present technology generates dynamic metadata including information regarding luminance of a picture, and encodes HDR video data such that the dynamic metadata is added to each picture serving as a random access point. For example, the dynamic metadata can be allowed to be added to the first picture of a GOP, the first picture serving as the random access point during fast-forward playback/rewind playback or cueing playback. The present technology can be applied to a Blu-ray (registered trademark) Disc player.

14 Claims, 35 Drawing Sheets

(51) Int. Cl.
  *G11B 27/30*    (2006.01)
  *H04N 21/231*   (2011.01)
  *H04N 21/2387*  (2011.01)
  *H04N 21/431*   (2011.01)
  *H04N 21/435*   (2011.01)
  *H04N 21/84*    (2011.01)

(52) U.S. Cl.
  CPC ....... *H04N 21/231* (2013.01); *H04N 21/2387* (2013.01); *H04N 21/435* (2013.01); *H04N 21/4318* (2013.01); *H04N 21/84* (2013.01)

(56) References Cited

U.S. PATENT DOCUMENTS

2016/0301907 A1* 10/2016 Uchimura ................ H04N 5/93
2016/0330513 A1* 11/2016 Toma ................... H04N 9/8205

FOREIGN PATENT DOCUMENTS

| | | |
|---|---|---|
| CN | 106981054 A | 7/2017 |
| EP | 3086559 A1 | 10/2016 |
| EP | 3240285 A1 | 11/2017 |
| JP | 2016-081553 A | 5/2016 |
| JP | 2017-103745 A | 6/2017 |
| JP | 2017-139052 A | 8/2017 |
| JP | 2017-183762 A | 10/2017 |
| WO | WO 2016/027423 A1 | 2/2016 |
| WO | WO 2016/039024 A1 | 3/2016 |

\* cited by examiner

FIG. 3

Dynamic metadata (SMPTE ST 2094)

1: For (windows) [(max3)
2: Window size, location
3: Internal Ellipse size, location
4: External Ellipse size, location
5: Rotation angle (0-180)
6: Overlap process option
7: maxscl
8: average max rgb
9: Distribution max rgb percentages (max15)
10: Distribution max rgb percentiles (max15)
11: Fraction bright pixels
12: Knee point
13: Bezier curve anchors (max15)
14: Color saturation weight
15: }

16: Target system display max luminance
17: Local display luminance (2×2 — 25×25)

18: Local mastering display luminance (2×2 — 25×25)

FIG. 20

| Syntax | No. of bits | Mnemonic |
|---|---|---|
| zzzzz.clpi { | | |
|     type_indicator | 8*4 | bslbf |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     ExtensionData_start_address | 32 | uimsbf |
|     reserved_for_future_use | 96 | bslbf |
|     ClipInfo() | | |
|     for(i=0;i<N1;i++) { | | |
|         padding_word | 16 | bslbf |
|     } | | |
|     SequenceInfo() | | |
|     for(i=0;i<N2;i++) { | | |
|         padding_word | 16 | bslbf |
|     } | | |
|     ProgramInfo() | | |
|     for (i=0;i<N3;i++) { | | |
|         padding_word | 16 | bslbf |
|     } | | |
|     CPI() | | |
|     for(i=0;i<N4;i++) { | | |
|         padding_word | 16 | bslbf |
|     } | | |
|     ClipMark() | | |
|     for(i=0;i<N5;i++) { | | |
|         padding_word | 16 | bslbf |
|     } | | |
|     ExtensionData() | | |
|     for(i=0;i<N6;i++) { | | |
|         padding_word | 16 | bslbf |
|     } | | |
| } | | |

FIG. 21

| Syntax | No. of bits | Mnemonic |
|---|---|---|
| CPI () { | | |
|   length | 32 | uimsbf |
|   if(length !=0) { | | |
|     reserved_for_word_align | 12 | bslbf |
|     CPI_type | 4 | bslbf |
|     EP_map() | | |
|   } | | |
| } | | |

FIG. 22

| Syntax | No. of bits | Mnemonic |
|---|---|---|
| EP_map() { | | |
|   reserved_for_word_align | 8 | bslbf |
|   number_of_stream_PID_entries | 8 | uimsbf |
|   for (k=0;k<number_of_stream_PID_entries;k++) { | | |
|     stream_PID[k] | 16 | bslbf |
|     reserved_for_word_align | 10 | bslbf |
|     EP_stream_type[k] | 4 | bslbf |
|     number_of_EP_coarse_entries[k] | 16 | uimsbf |
|     number_of_EP_fine_entries[k] | 18 | uimsbf |
|     EP_map_for_one_stream_PID_start_address[k] | 32 | uimsbf |
|   } | | |
|   for (i=0;i<X;i++) { | | |
|     padding_word | 16 | bslbf |
|   } | | |
|   for (k=0;k<number_of_stream_PID_entries;k++) { | | |
|     EP_map_for_one_stream_PID(EP_stream_type[k], | | |
|       number_of_EP_coarse_entries[k], | | |
|       number_of_EP_fine_entries[k]) | | |
|     for (i=0;i<Y[k];i++) { | | |
|       padding_word | 16 | bslbf |
|     } | | |
|   } | | |
| } | | |

FIG. 23

| Syntax | No. of bits | Mnemonic |
|---|---|---|
| EP_map_for_one_stream_PID(EP_stream_type, Nc, Nf) { | | |
|   EP_fine_table_start_address | 32 | uimsbf |
|   for (i=0; i<Nc; i++) { | | |
|     ref_to_EP_fine_id[i] | 18 | uimsbf |
|     PTS_EP_coarse[i] | 14 | uimsbf |
|     SPN_EP_coarse[i] | 32 | uimsbf |
|   } | | |
|   for (i=0; i<X; i++) { | | |
|     padding_word | 16 | bslbf |
|   } | | |
|   for (EP_fine_id = 0; | | |
|     EP_fine_id < Nf; | | |
|     EP_fine_id ++) { | | |
|     is_angle_change_point[EP_fine_id] | 1 | bslbf |
|     I_end_position_offset[EP_fine_id] | 3 | bslbf |
|     PTS_EP_fine[EP_fine_id] | 11 | uimsbf |
|     SPN_EP_fine[EP_fine_id] | 17 | uimsbf |
|   } | | |
| } | | |

INFORMATION PROCESSING APPARATUS, INFORMATION PROCESSING METHOD, RECORDING MEDIUM, PLAYBACK APPARATUS, PLAYBACK METHOD, AND PROGRAM

CROSS REFERENCE TO PRIOR APPLICATION

This application is a National Stage Patent Application of PCT International Patent Application No. PCT/JP2018/040789 (filed on Nov. 2, 2018) under 35 U.S.C. § 371, which claims priority to Japanese Patent Application No. 2017-221549 (filed on Nov. 17, 2017), which are all hereby incorporated by reference in their entirety.

TECHNICAL FIELD

The present technology relates to an information processing apparatus, an information processing method, a recording medium, a playback apparatus, a playback method, and a program, and particularly relates to an information processing apparatus, an information processing method, a recording medium, a playback apparatus, a playback method, and a program that are designed to prevent an unnatural change in luminance during random access.

BACKGROUND ART

Ultra HD Blu-ray (registered trademark) Disc (UHD BD) is a BD standard that supports recording a high dynamic range (HDR) video, which is a video having an extended dynamic range. While the maximum luminance of a standard dynamic range (SDR) is 100 nits (100 cd/m$^2$), the maximum luminance of an HDR video is higher than that, such as 10,000 nits.

As metadata for an HDR video stream, Dynamic metadata is defined in SMPTE ST 2094, the Dynamic metadata being the metadata including luminance information on a picture (frame) basis. During playback of an HDR video stream to which Dynamic metadata is added, each picture is transmitted from the player side to the TV side along with Dynamic metadata.

On the TV side, if the maximum luminance of the display is lower than the luminance of the HDR video, a process for compressing the luminance of the HDR video is performed on the basis of the Dynamic metadata transmitted from the BD player.

CITATION LIST

Patent Document

Patent Document 1: Japanese Patent Application Laid-Open No. 2017-139052

SUMMARY OF THE INVENTION

Problems to be Solved by the Invention

Random access may occur during playback of an HDR video. Random access refers to the playback involving a jump over a section, such as special playback (trick play), which is fast-forward/rewind playback at x-fold speed, or chapter jump (cueing playback). When an instruction to perform such special playback or chapter jump is given by a user, random access occurs.

Depending on the state of the destination picture of a jump made for random access, such as the state in which no Dynamic metadata is added, an unnatural change in luminance may occur.

The present technology has been made in view of such circumstances, and is intended to prevent an unnatural change in luminance during random access.

Solutions to Problems

An information processing apparatus according to a first aspect of the present technology includes: a generation unit that generates dynamic metadata including information regarding luminance of a picture; and an encoding unit that encodes HDR video data such that the dynamic metadata is added to each picture serving as a random access point.

A playback apparatus according to a second aspect of the present technology includes: a playback unit that performs random access playback of a video stream to which dynamic metadata including information regarding luminance of a picture is added; and an output control unit that, in a case where predetermined information indicating that random access playback is being performed is to be superimposed on the picture and displayed, adds metadata to be used during random access playback for luminance adjustment during the random access playback to the picture serving as a random access point, and outputs the picture to which the metadata to be used during the random access playback is added to a display apparatus.

In the first aspect of the present technology, dynamic metadata including information regarding luminance of a picture is generated; and HDR video data is encoded such that the dynamic metadata is added to each picture serving as a random access point.

In the second aspect of the present technology, random access playback of a video stream to which dynamic metadata including information regarding luminance of a picture is added is performed; in a case where predetermined information indicating that random access playback is being performed is to be superimposed on the picture and displayed, metadata to be used during random access playback for luminance adjustment during the random access playback is added to the picture serving as a random access point; and the picture to which the metadata to be used during the random access playback is added is output to a display apparatus.

Effects of the Invention

According to the present technology, an unnatural change in luminance occurring during random access can be prevented.

Note that the effects described above are not restrictive, and any of effects described in the present disclosure may be included.

BRIEF DESCRIPTION OF DRAWINGS

FIG. 3 is a diagram showing Dynamic metadata defined in SMPTE ST 2094-40.

FIG. 20 is a diagram showing the syntax of Clip Information.

FIG. 21 is a diagram showing the syntax of CPI( ).

FIG. 22 is a diagram showing the syntax of EP_map( ).

FIG. 23 is a diagram showing the syntax of EP_map_for_one_stream_PID.

MODE FOR CARRYING OUT THE INVENTION

A mode for carrying out the present technology will now be described. Descriptions are provided in the order mentioned below.

1. Metadata for HDR video
2. Luminance change during random access playback
3. First embodiment (example of constraint on encoding)
4. Second embodiment (example in which default metadata is used)
5. Example configuration of playback system
6. Other examples <<Metadata for HDR Video>>

Figure 1:
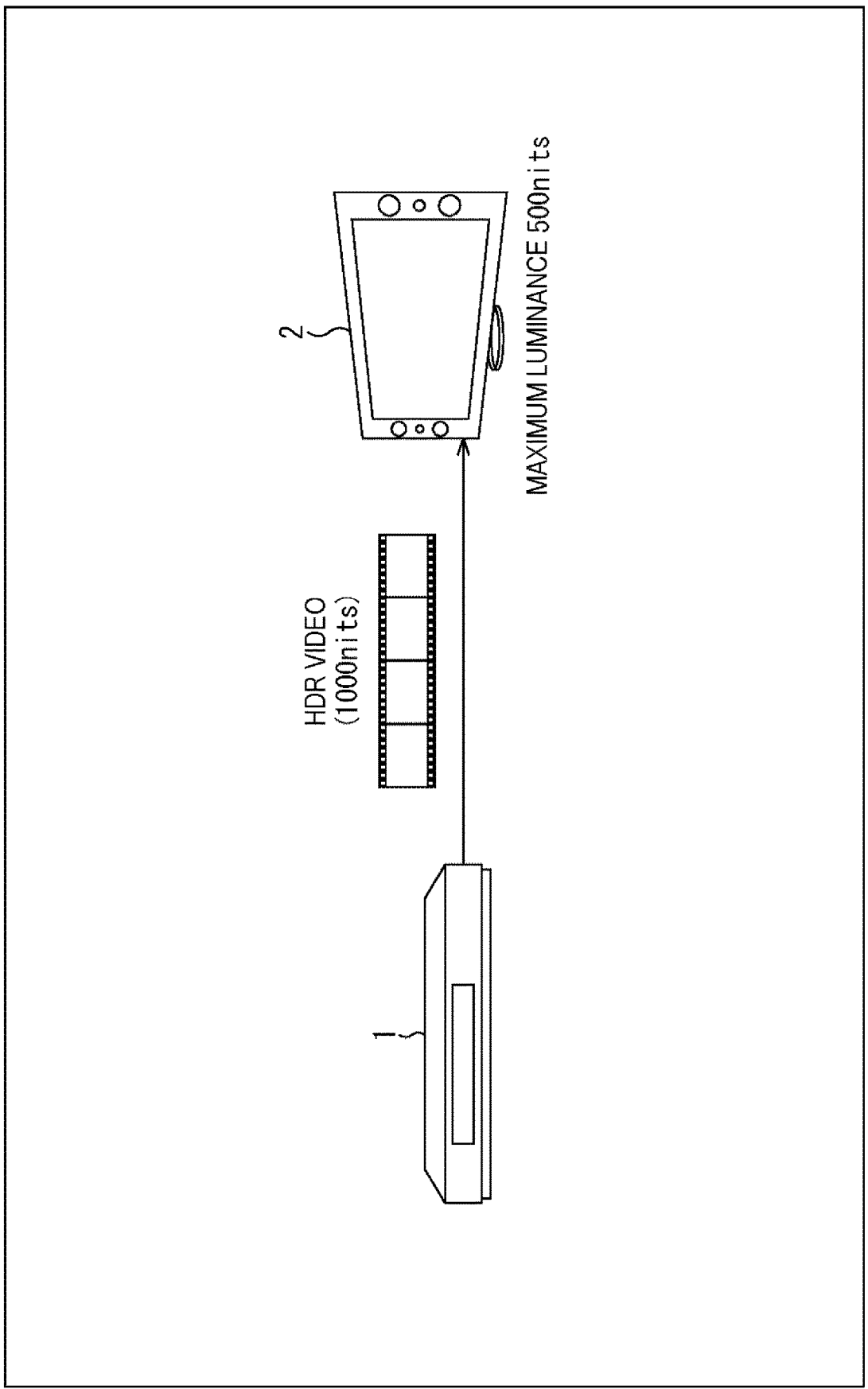
FIG. 1 is a diagram illustrating an example configuration of an HDR content playback system.

FIG. 1 is a diagram illustrating an example configuration of an HDR content playback system.

The playback system in FIG. 1 includes a playback apparatus 1 and a TV (television receiver) 2 connected to each other by a cable compliant with a predetermined standard such as High-Definition Multimedia Interface (HDMI) (registered trademark) 2.0a or HDMI 2.1. The playback apparatus 1 and the TV 2 may also be connected to each other via a wireless interface.

The playback apparatus 1 is an apparatus supporting playback of HDR content, such as a UHD BD player. A BD on which HDR content is recorded is to be loaded into a drive in the playback apparatus 1. The content to be played back by the playback apparatus 1 includes audio data as well as HDR video data.

The TV 2 has a function of displaying a video that has been input from the outside, as well as a function of receiving and displaying a broadcast program that has been transmitted through transmission lines including broadcast waves and networks. The TV 2 includes a display device that supports displaying an HDR video having a luminance greater than 100 nits.

Before transmission of an HDR video is started, the playback apparatus 1 and the TV 2 set up an HDMI transmission configuration by, for example, sending and receiving to/from each other the information regarding their respective performance capabilities. For example, the playback apparatus 1 notifies the TV 2 that an HDR video will be transmitted. Furthermore, the TV 2 notifies the playback apparatus 1 of the maximum luminance of the display on the TV 2.

After the transmission configuration, the playback apparatus 1 decodes the HDR video stream that has been read from the BD and outputs individual pictures in the HDR video to the TV 2. The TV 2 receives and displays the individual pictures transmitted from the playback apparatus 1.

During the operation, in the TV 2, a process of adjusting (compressing) the luminance of the HDR video transmitted from the playback apparatus 1 is performed as appropriate in accordance with the performance capability of the display. The luminance compression is performed in a case where the luminance of the HDR video output by the playback apparatus 1 is higher than the maximum luminance of the display in the TV 2.

The example in FIG. 1 assumes that the luminance of an HDR video output by the playback apparatus 1 is 1,000 nits and the maximum luminance of the display in the TV 2 is 500 nits.

Figure 2:
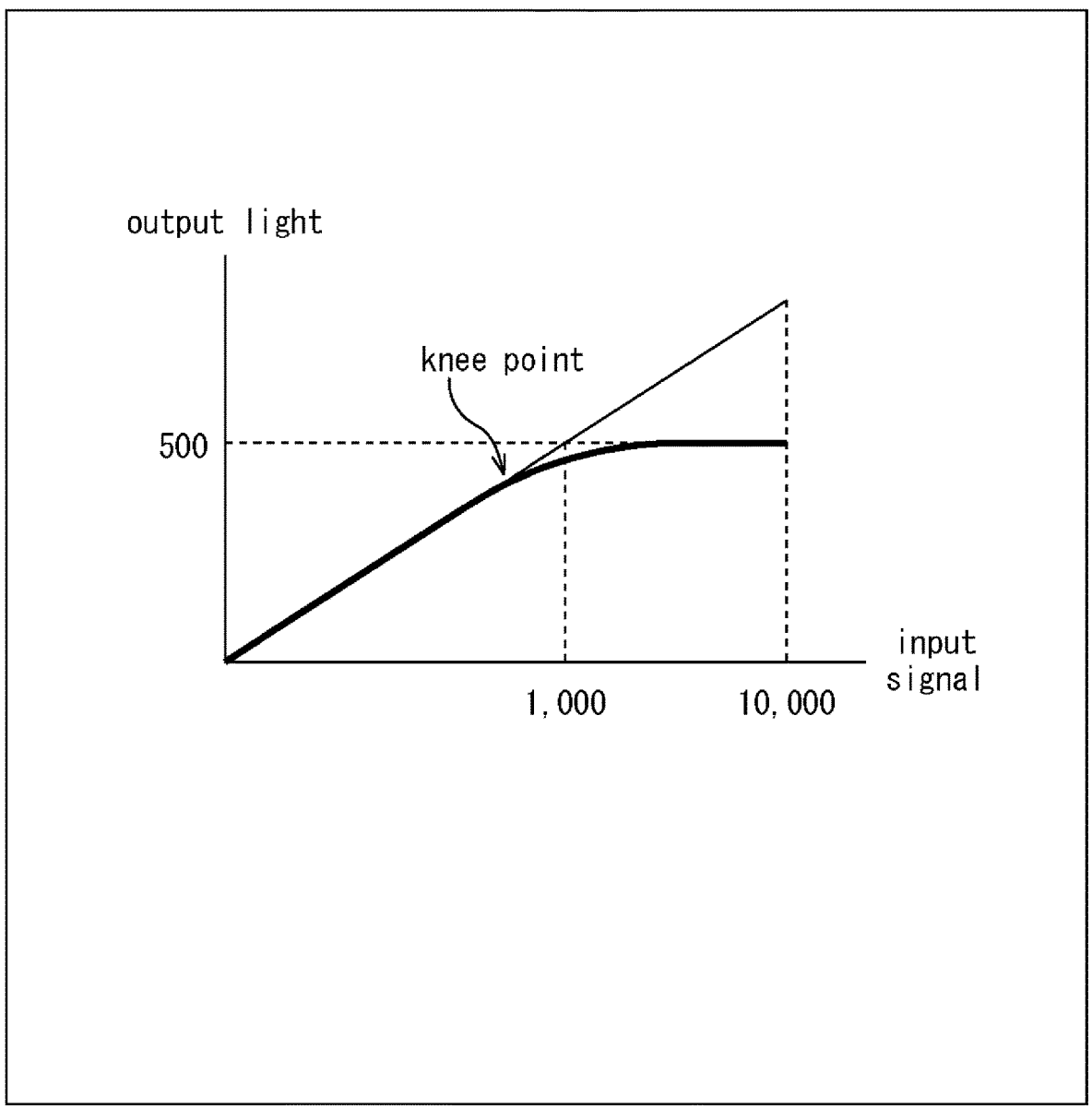
FIG. 2 is a diagram illustrating an example of a tone curve used for luminance compression on an HDR video.

FIG. 2 is a diagram illustrating an example of a tone curve used for luminance compression on an HDR video.

In FIG. 2, the horizontal axis represents the luminance of an input signal, while the vertical axis represents the luminance of an output (display). For example, the electro-optical transfer function (EOTF) processing with a Perceptual Quantization (PQ) curve as defined in SMPTE ST 2084 is performed on the TV 2 side, and the luminance of an HDR video is compressed so as to fall within a luminance range of the display whose maximum luminance is 500 nits.

Note that the point at which the light and dark representation is no longer linear as indicated by the arrowhead in FIG. 2 is called a knee point.

Thus, in the playback system in FIG. 1, in a case where the display in the TV 2 does not have sufficient luminance relative to the luminance of an HDR video that is output by the playback apparatus 1, luminance compression is performed on the TV 2 side.

As supplementary information for luminance compression, metadata including information regarding luminance of the content is transmitted from the playback apparatus 1 to the TV 2. For example, Dynamic metadata is transmitted from the playback apparatus 1 to the TV 2.

Dynamic metadata, which is the metadata dynamically representing information regarding luminance of the content on a picture basis, is standardized in SMPTE ST 2094.

FIG. 3 is a diagram showing Dynamic metadata defined in SMPTE ST 2094-40.

As shown in the first line in FIG. 3, information regarding window(s) that are set in a frame is described in the Dynamic metadata. A window is a rectangular area that is set in a frame. Up to three windows can be set in a single frame.

For each window that is set in a frame, individual parameters shown in the 2nd to 14th lines are described.

Window size and Window location indicate the size and location of a window.

Internal Ellipse size and Internal Ellipse location indicate the size and location of an internal ellipse, which is one of two ellipses that are set in a window. Ellipses are allowed to be set in a window so that the luminance in an ellipse can be specified.

External Ellipse size and External Ellipse location indicate the size and location of an external ellipse, which is one of two ellipses that are set in a window.

Rotation angle indicates the inclination of the two ellipses that are set in a window.

Overlap process option indicates the method for processing pixels in an ellipse.

maxscl indicates the RGB values of the brightest pixel in a window.

average max rgb indicates the average of maximum R, G, and B values of individual pixels in a window.

Distribution max rgb percentages indicates the ranking of the highest luminance in a window as a percentage.

Distribution max rgb percentiles indicates the ranking of the highest luminance in a window as a rank order (percentile).

Fraction bright pixels indicates to what extent the image having the maximum luminance value in a scene is to be output.

Knee point indicates the luminance value at the knee point described above.

Bezier curve anchors indicates the sample x,y having brightness exceeding the knee point.

Color saturation weight indicates the value to be used for correcting RGB values that change during luminance compression on the target display.

Target System display max luminance indicates the luminance of the target display. With Target System display max luminance, it is determined that the content has been created on the assumption that the content is to be displayed on such display.

Local display luminance indicates the maximum luminance value of each of 2×2 areas to 25×25 areas into which the display is divided.

Local mastering display luminance indicates the maximum luminance value of each of 2×2 areas to 25×25 areas into which the mastering display is divided.

As seen above, parameters in the 1st to 15th lines in Dynamic metadata indicate attributes of a frame (a window in a frame). Furthermore, parameters in the 16th and 17th lines indicate attributes of the target display, and a parameter in the 18th line indicates attributes of the display used for creating the content.

Figure 4:
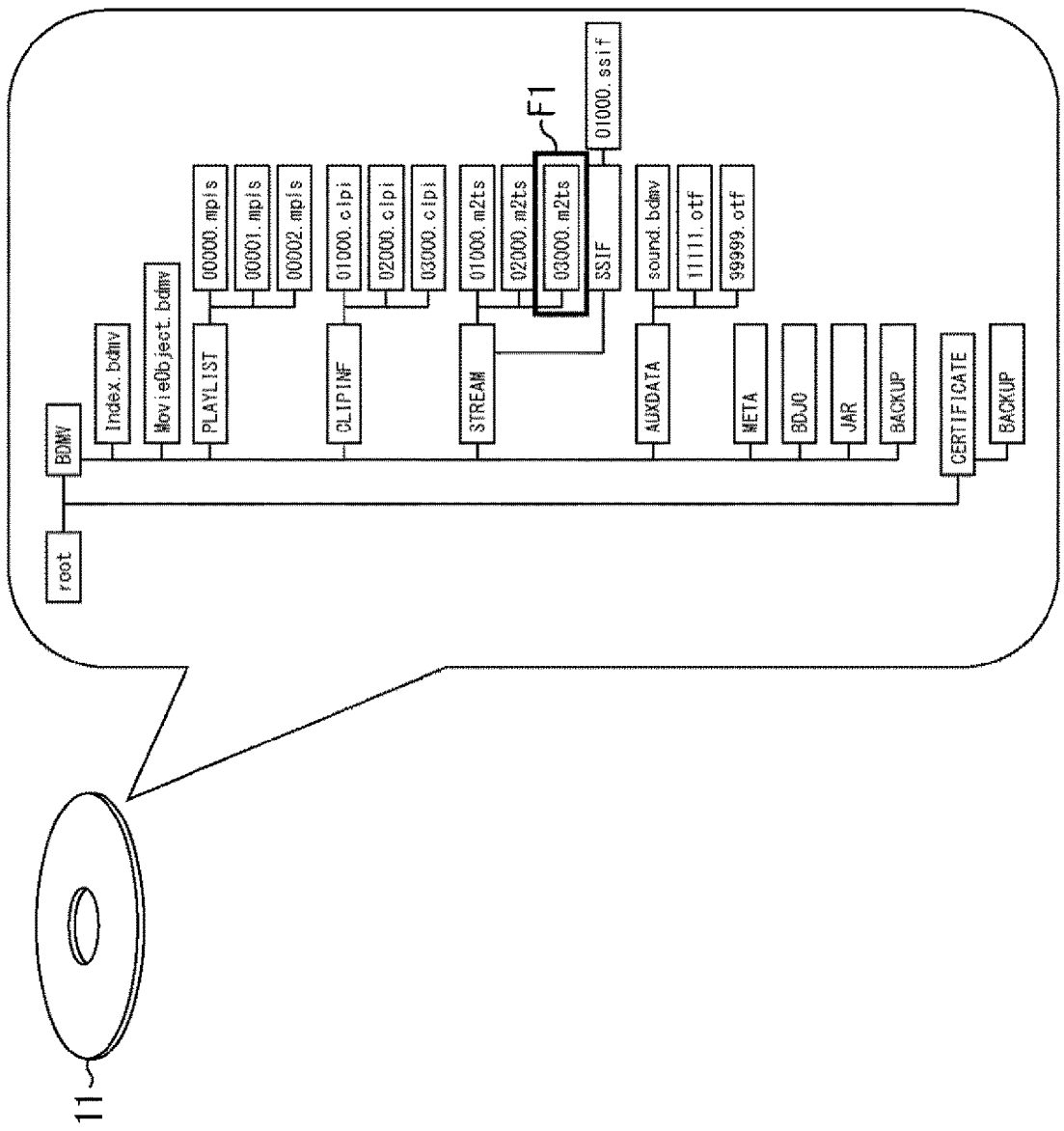
FIG. 4 is a diagram illustrating a BD file structure.

FIG. 4 is a diagram illustrating a BD file structure.

An optical disc 11 in FIG. 4 is a recording medium on which the content of an HDR video is recorded in the BD format.

As described later in detail, an AV stream file with the m2ts extension is stored in the STREAM directory disposed under the BDMV directory.

An AV stream file is an MPEG-2 TS file obtained by multiplexing, according to MPEG-2, an HDR video stream, an audio stream, a subtitles stream, and so on. In the example in FIG. 4, AV stream files "01000.m2ts", "02000.m2ts", and "03000.m2ts" are stored in the STREAM directory.

An HDR video stream is an encoded stream according to, for example, High Efficiency Video Coding (HEVC). Dynamic metadata is included in an HDR video stream as a Supplemental Enhancement Information (SEI) message according to HEVC.

Figure 5:
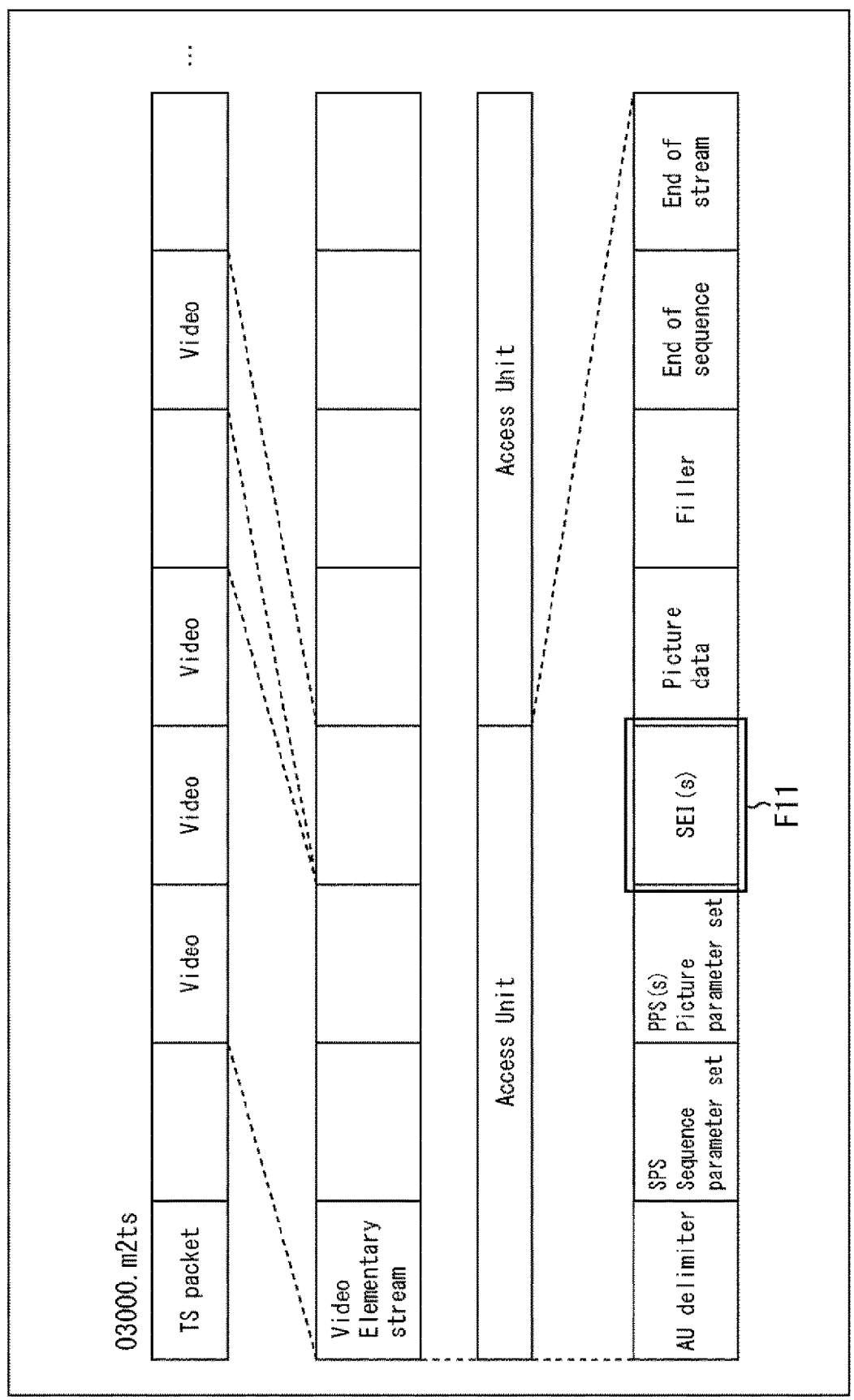
FIG. 5 is a diagram illustrating an example of an AV stream structure.

FIG. 5 is a diagram illustrating an example structure of the AV stream "03000.m2ts", which is enclosed in a frame F1 in FIG. 4.

As shown on the top line in FIG. 5, the AV stream "03000.m2ts" includes TS packets each storing video data, audio data, subtitles data, or the like. Video TS packets are put together into a Video Elementary stream.

A Video Elementary stream includes an array of Access Units, where each Access Unit represents data of a single picture in an HDR video. Each Access Unit includes an AU delimiter followed by parameters such as SPS and PPS, and also includes an SEI message as enclosed and indicated by a frame F11.

The SEI message includes the aforementioned Dynamic metadata. Note that HDR video data designated as Picture data is included, following the SEI message.

In this way, on a BD, Dynamic metadata is included in an HDR video stream in such a way that Dynamic metadata is added to each picture, and the Dynamic metadata is multiplexed with audio streams and others.

Note that pictures included in an HDR video stream may include a picture to which no Dynamic metadata is added.

Figure 6:
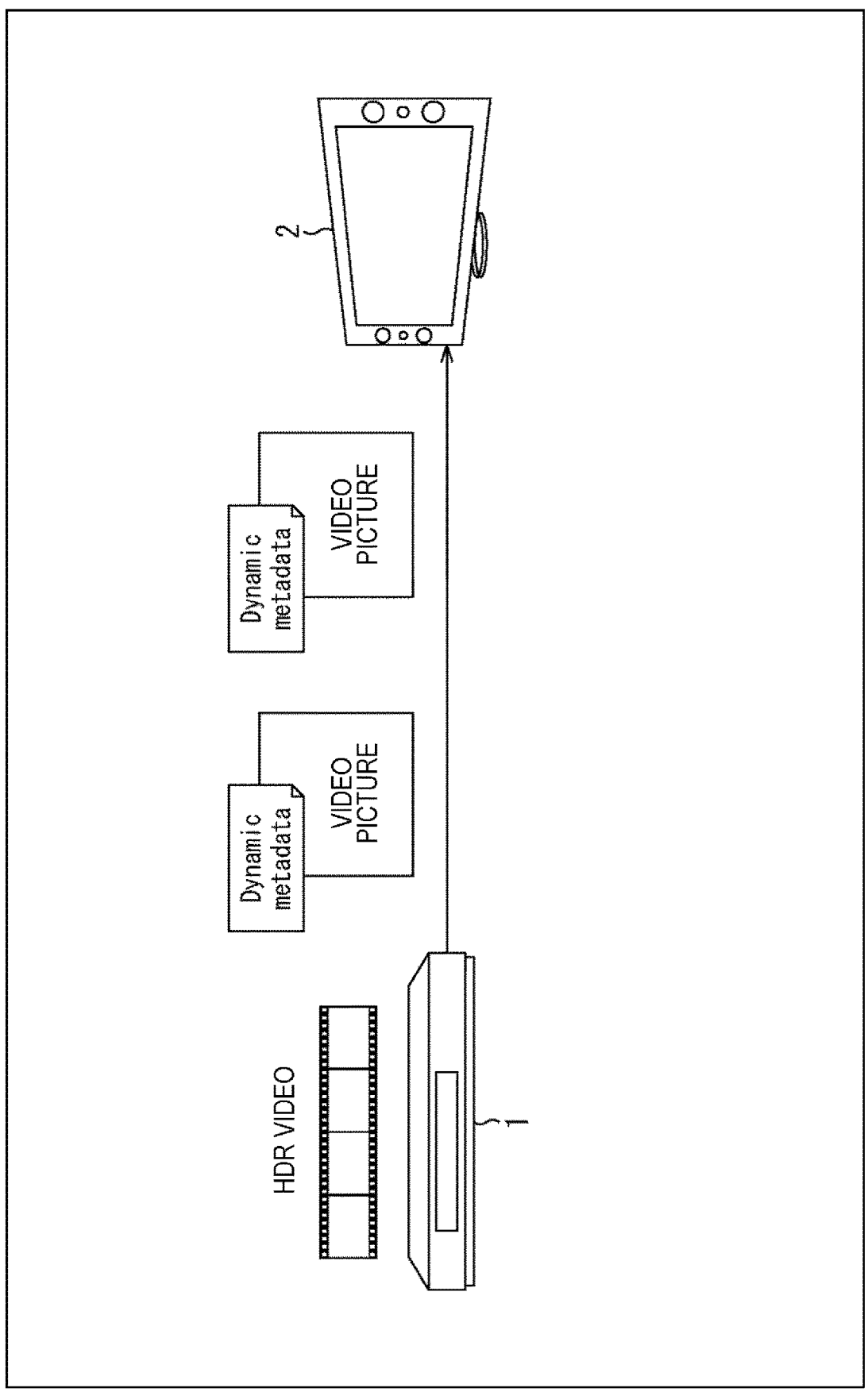
FIG. 6 is a diagram illustrating an example of transmission of Dynamic metadata.

FIG. 6 is a diagram illustrating an example of transmission of Dynamic metadata.

As illustrated in FIG. 6, Dynamic metadata is associated with each picture obtained by decoding an HDR video stream and is transmitted from the playback apparatus 1 to the TV 2. In the TV 2, luminance compression on each picture is performed on the basis of the Dynamic metadata transmitted along with each picture.

<<Luminance Change During Random Access Playback>>

The playback apparatus 1 has a function of performing random access playback, which is a playback method involving random access.

Random access means a jump along a sequence of pictures included in an HDR video stream, the jump being made over the pictures to be played back from one picture to another picture other than the pictures adjacent to the one picture.

Random access playback includes special playback and cueing playback. Special playback means fast-forward playback/rewind playback at x-fold speed, where x is a predetermined number, such as 5× or 8× speed. In addition, cueing playback means a playback method including jumping to a picture containing a chapter setting or to a picture corresponding to a certain time ahead and starting playback from the jump destination picture.

Figure 7:
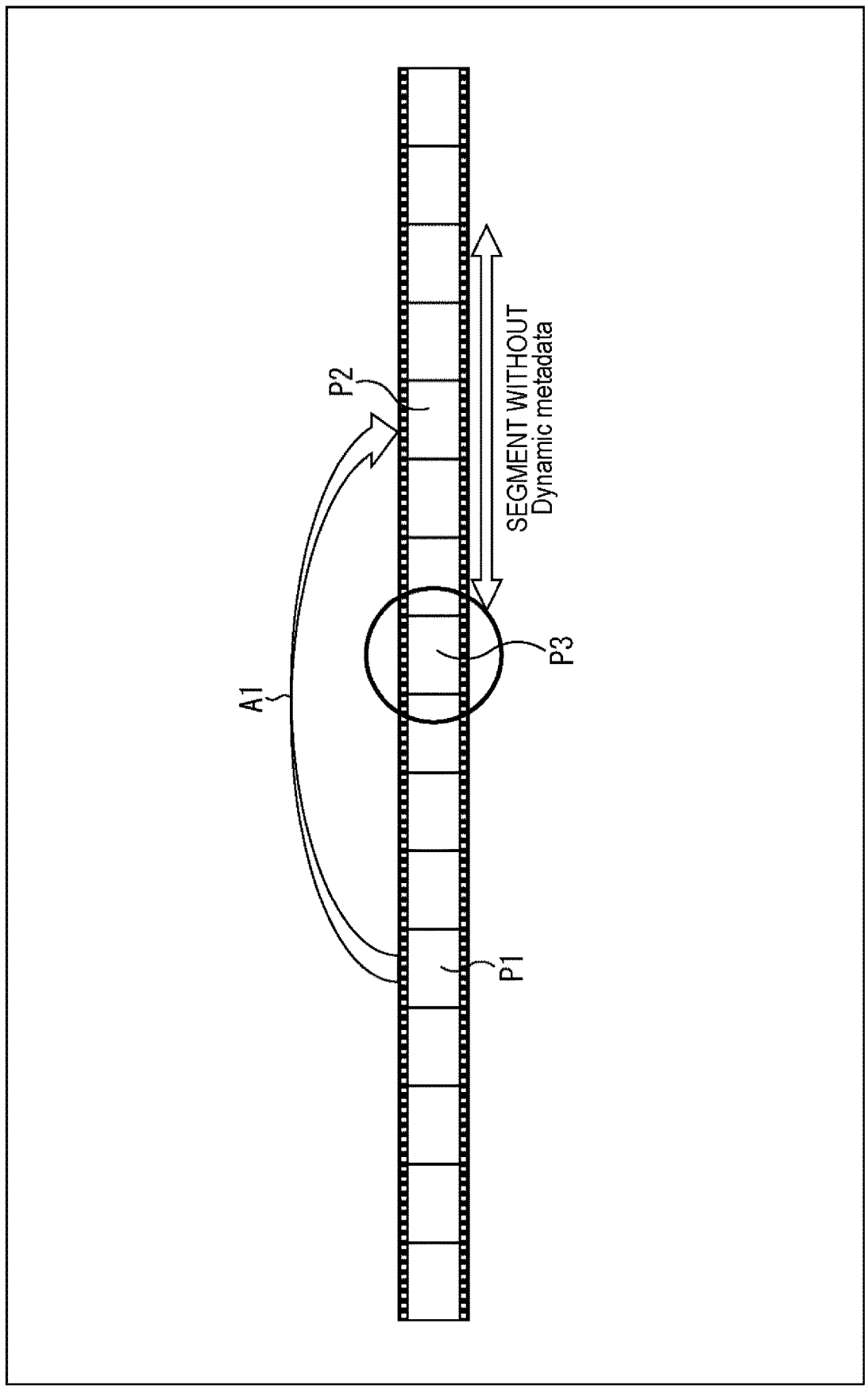
FIG. 7 is a diagram illustrating an example of random access playback.

FIG. 7 is a diagram illustrating an example of random access playback.

As an example, the following describes the case where an instruction to perform cueing playback is given at a time when the picture P1 is about to be played back, and a jump is made from the picture P1 to the picture P2 as indicated by the arrow A1 in FIG. 7.

Before the instruction to perform cueing playback is given, the individual pictures preceding (on the left of) the picture P1 are output to the TV 2 along with the Dynamic metadata added to the respective pictures. Furthermore, the picture P1 is output to the TV 2 along with the Dynamic metadata added to the picture P1.

Furthermore, when an instruction to perform cueing playback is given, the picture P2 is output along with the metadata to be used for luminance compression on the picture P2 on the TV 2 side. Here, in a case where the picture P2 is within a section in which no Dynamic metadata is added as indicated by the double-headed arrow, any of various types of metadata may possibly be output along with the picture P2.

For example, it may be possible that, along with the picture P2, the Dynamic metadata for the picture P1, from which the jump has been made, is caused to be output from the playback apparatus 1 to the TV 2. In this case, luminance compression on the picture P2 is performed in the TV 2 on the basis of the Dynamic metadata for the picture P1.

Furthermore, it may be possible that, along with the picture P2, the Dynamic metadata for the picture that has Dynamic metadata added thereto and that immediately precedes the picture P2, namely the picture P3, is caused to be output from the playback apparatus 1 to the TV 2. In this case, luminance compression on the picture P2 is performed in the TV 2 on the basis of the Dynamic metadata for the picture P3.

In either case, the picture P2, which is the jump destination picture, may undergo luminance compression not intended by the producer of the HDR content. As a result, the appearance of the picture P2 will be different from the appearance expected by the producer of the HDR content.

Figure 8:
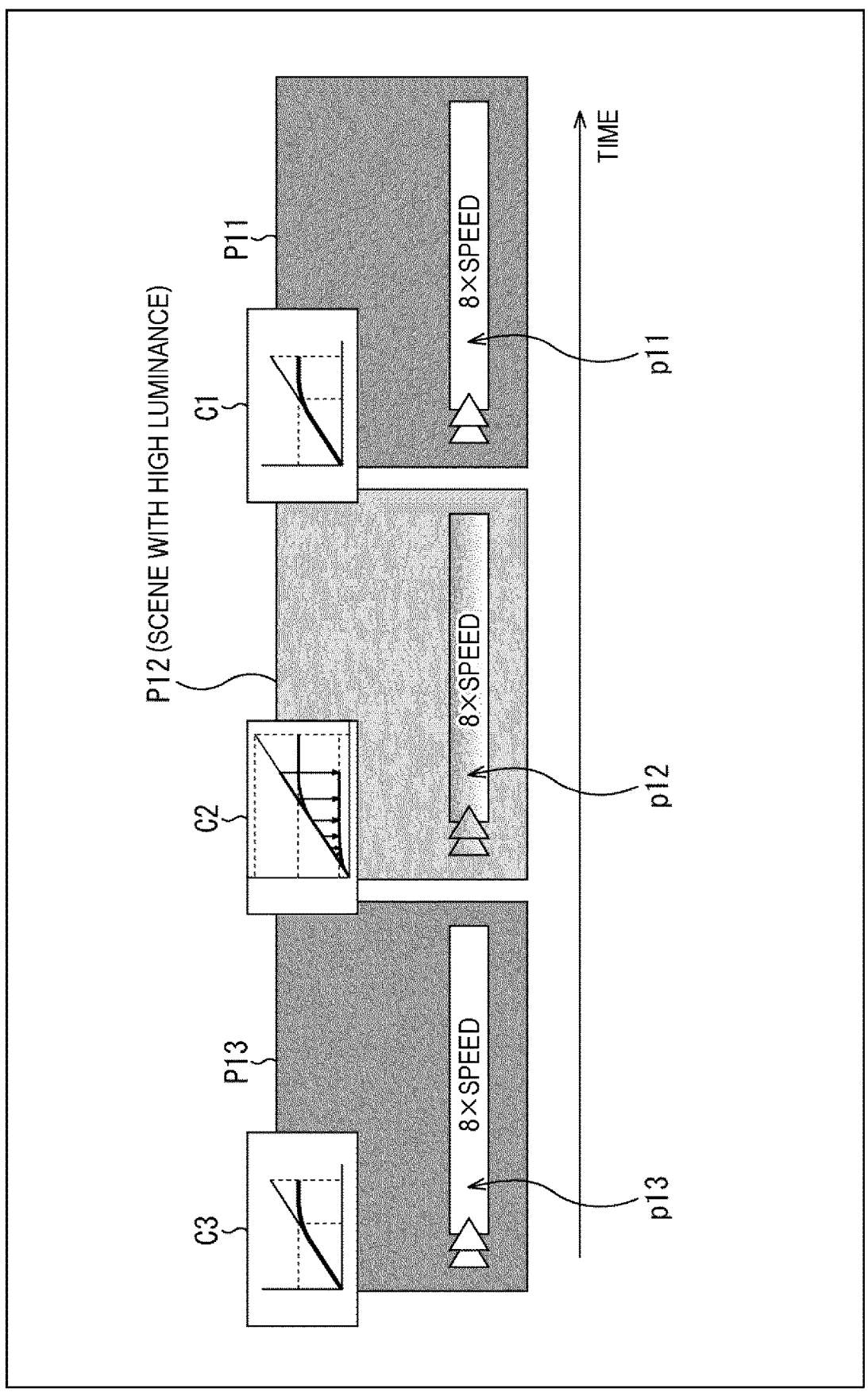
FIG. 8 is a diagram illustrating examples of display provided during random access playback.

FIG. 8 is a diagram illustrating examples of display provided during random access playback.

The horizontal axis in FIG. 8 represents time. Pictures P11, P12, and P13 are transmitted from the playback apparatus 1 to the TV 2 in the order mentioned and undergo luminance compression in the TV 2.

The pictures P11, P12, and P13 are respectively combined with OSD images p11, p12, and p13 in the playback apparatus 1 in response to, for example, an instruction given by the user to perform fast-forward playback at 8× speed. In the example in FIG. 8, as an OSD image, an image obtained by combining an image of two triangles representing fast-forward playback with an image of a horizontally long strip with characters representing 8× speed is displayed.

A similar OSD image is displayed when an instruction to perform rewind playback is given. Likewise, when an instruction to perform cueing playback is given, an OSD image including the jump destination chapter number or the like is displayed.

For example, suppose that the picture P12 includes a scene with higher luminance than the pictures P11 and P13.

Luminance compression on the picture P11 combined with the OSD image p11 is performed on the basis of a tone curve C1 represented by the Dynamic metadata that has been transmitted along with the picture P11.

Luminance compression on the picture P12 combined with the OSD image p12 is performed on the basis of a tone curve C2 represented by the Dynamic metadata that has been transmitted along with the picture P12. Luminance compression on the picture P13 combined with the OSD image p13 is performed on the basis of a tone curve C3 represented by the Dynamic metadata that has been transmitted along with the picture P13.

The tone curve C2 used for luminance compression on the picture P12 including a highly bright scene represents that the luminance is to be compressed more intensely than the tone curve C1 used for luminance compression on the picture P11 and the tone curve C3 used for luminance compression on the picture P13. The luminance of the OSD image p12 is also compressed more intensely than the luminance of the OSD image on each of the pictures P11 and P13.

Therefore, when the OSD images on the individual pictures subsequent to the luminance compression are compared in terms of appearance, the OSD image p12 on the picture P12 is displayed with lower luminance than the OSD images on the pictures P11 and P13, as illustrated in FIG. 8. In FIG. 8, the OSD image p12 shown in lighter color represents that the OSD image has lower luminance than the OSD images on the pictures P11 and P13.

When the pictures P11 to P13 are sequentially displayed, the luminance of the OSD image is lowered by one step at a time when the picture P12 is displayed, and accordingly the appearance may be unnatural depending on the degree of luminance compression. For example, in the case of consecutive scenes involving greater luminance changes, the OSD images may appear to be blinking.

As seen above, when random access playback is performed on an HDR video stream including Dynamic metadata, the HDR video may look unnatural if no Dynamic metadata is added to the jump destination picture. Furthermore, an OSD image superimposed on the HDR video may also look unnatural.

First Embodiment (Example of Constraint on Encoding)

<Example in which Dynamic Metadata is Compulsorily Added to First Picture of GOP>

Figure 9:
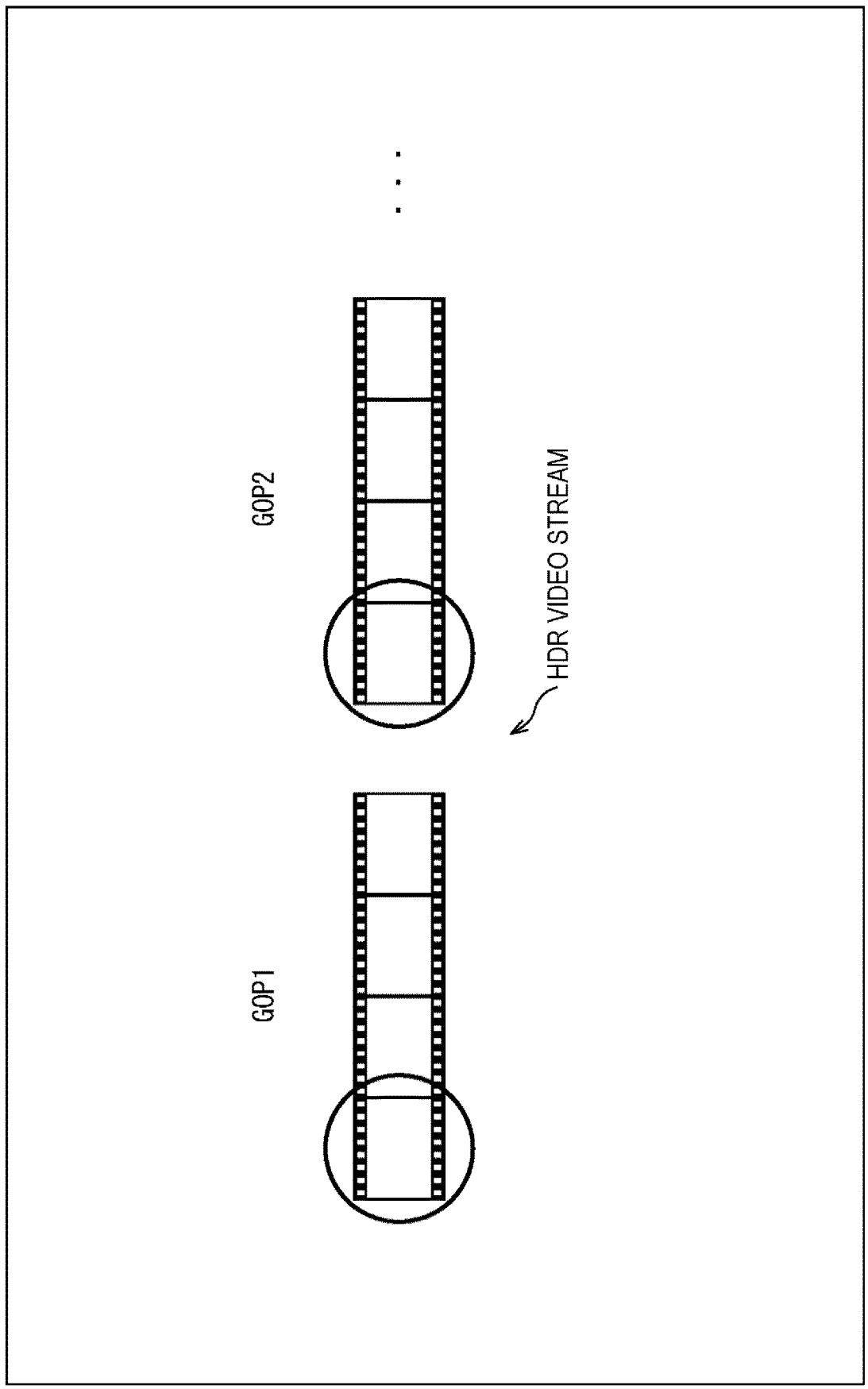
FIG. 9 is a diagram illustrating examples of a GOP included in an HDR video stream.

FIG. 9 is a diagram illustrating examples of a GOP included in an HDR video stream.

An HDR video stream recorded on the optical disc 11 is an encoded stream according to, for example, High Efficiency Video Coding (HEVC) and is made up of pictures in units of GOP. The example in FIG. 9 shows a GOP 1 and a GOP 2.

Among the pictures included in an HDR video stream, Dynamic metadata is added to at least the picture P1 and the picture P2, which are the first picture of the GOP1 and the first picture of the GOP 2, respectively. The picture P1 and the picture P2, each of which is the first picture of a GOP in terms of display order, are the pictures serving as random access points.

In other words, the HDR video stream recorded on the optical disc 11 is a stream generated under the constraint that Dynamic metadata is compulsorily added to the picture serving as a random access point.

Fast-forward playback and rewind playback are performed such that, for example, only the first pictures of their respective GOPs are sequentially played back. The playback apparatus 1 outputs the first picture of each GOP to the TV 2, the first picture serving as a random access point, along with the Dynamic metadata added to the first picture of each GOP.

Furthermore, cueing playback is performed such that playback starts from the first picture of a certain GOP. The playback apparatus 1 outputs the first picture of a certain GOP to the TV 2, the first picture serving as a random access point, along with the Dynamic metadata added to the picture.

In the TV 2, luminance compression is performed on the first picture of a GOP, the first picture serving as a random access point, on the basis of the Dynamic metadata that has been transmitted along with the first picture of the GOP. Pictures that have undergone luminance compression are displayed, whereby fast-forward playback/rewind playback or cueing playback is fulfilled.

Thus, Dynamic metadata is compulsorily added to the picture serving as a random access point, which makes it possible to prevent the jump destination picture from undergoing luminance compression in a manner not intended by the producer of the HDR content.

Note that, although it is assumed that HDR video streams recorded on the optical disc 11 are encoded streams according to HEVC, the HDR video streams may be generated by encoding in accordance with another method such as AVC (H.264/MPEG-4 Advanced Video Coding (AVC)).

An AVC video stream includes units forming encoding units such as coded video sequences (CVSs). AVC video streams are generated by performing encoding under the constraint that Dynamic metadata is compulsorily added to the first picture of a CVS, the first picture serving as a random access point.

Furthermore, instead of being recorded on the optical disc 11, HDR video streams generated under the constraint that Dynamic metadata is compulsorily added to the picture serving as a random access point may be distributed via a network such as the Internet. A configuration of a system that distributes HDR video streams generated under such constraint will be described later.

<BD Format>

Here, the BD-ROM format is described.

—Data Management Structure

Figure 10:
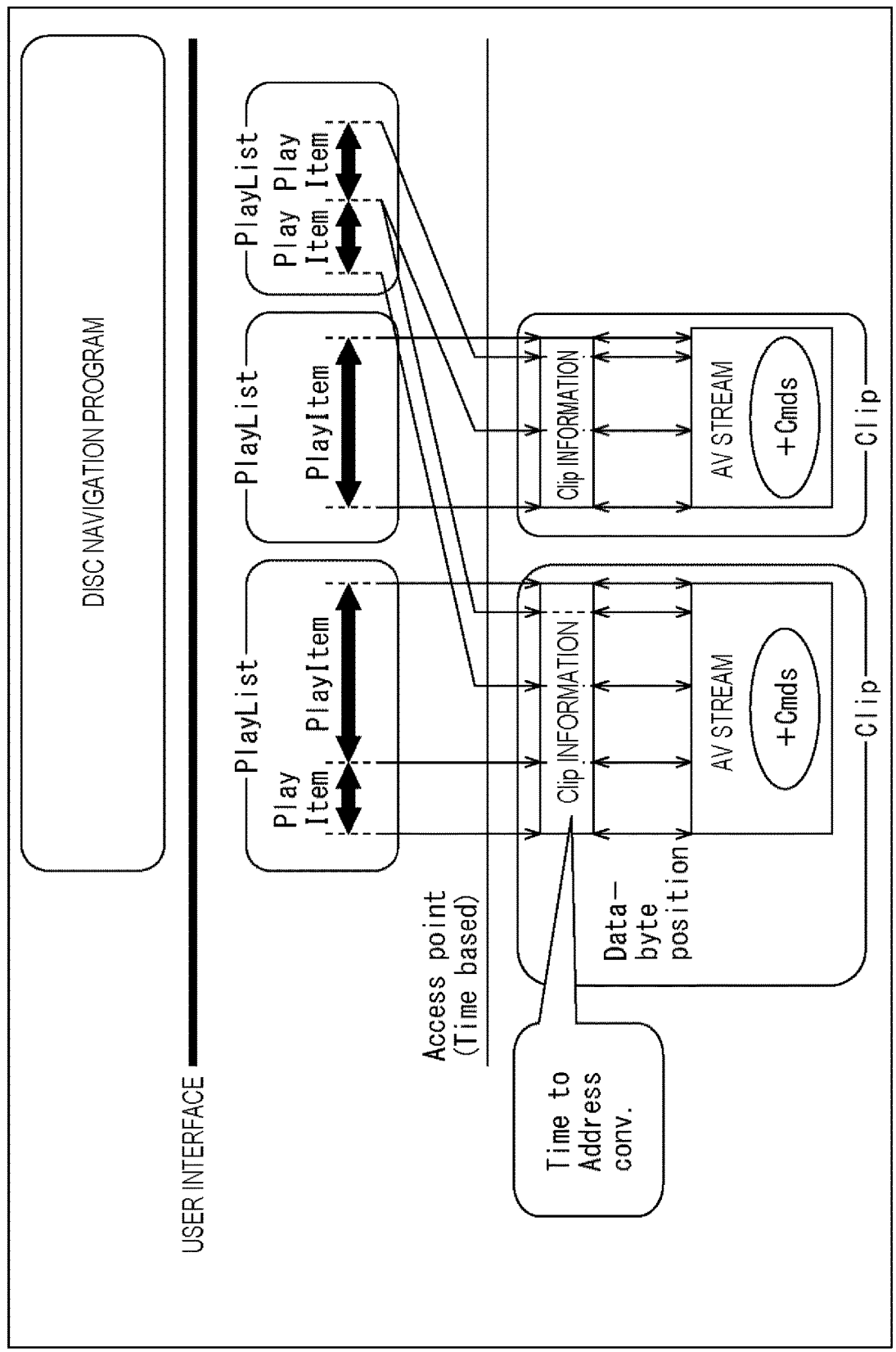
FIG. 10 is a diagram illustrating an example of an AV stream management structure according to the BD-ROM format.

FIG. 10 is a diagram illustrating an example of an AV stream management structure according to the BD-ROM format.

AV streams are managed by using two layers: PlayList and Clip. AV streams may be recorded not only on the optical disc 11 but also on a local storage for the playback apparatus 1.

A pair of one AV stream and its associated information called Clip Information is managed as one object. A pair of an AV stream and Clip Information is called a Clip.

An AV stream is extended along a time axis, and the access point of each Clip is specified mainly by a time stamp in a PlayList. Clip Information is used for purposes including finding an address from which decoding is to be started in an AV stream, for example.

A PlayList is a group of playback sections in an AV stream. A single playback section in an AV stream is called a PlayItem. The PlayItem is represented by an IN-point and an OUT-point of a playback section on the time axis. As illustrated in FIG. 10, a PlayList includes one or more PlayItems.

The first PlayList from the left in FIG. 10 includes two PlayItems, and these two PlayItems reference the first half and the second half, respectively, of the AV stream included in the Clip on the left side.

The second PlayList from the left includes one PlayItem, and the one PlayItem references the entire AV stream included in the Clip on the right side.

The third PlayList from the left includes two PlayItems, and these two PlayItems respectively reference a certain part of the AV stream included in the Clip on the left side and a certain part of the AV stream included in the Clip on the right side.

For example, when the disc navigation program specifies, as the playback target, the left PlayItem included in the first PlayList from the left, the first half of the AV stream included in the left Clip referenced by the PlayItem is played back.

In a PlayList, a playback path created with an array of one or more PlayItems is called a Main Path. Furthermore, in a PlayList, a playback path created with an array of one or more SubPlayItems in parallel with a Main Path is called a Sub Path.

Figure 11:
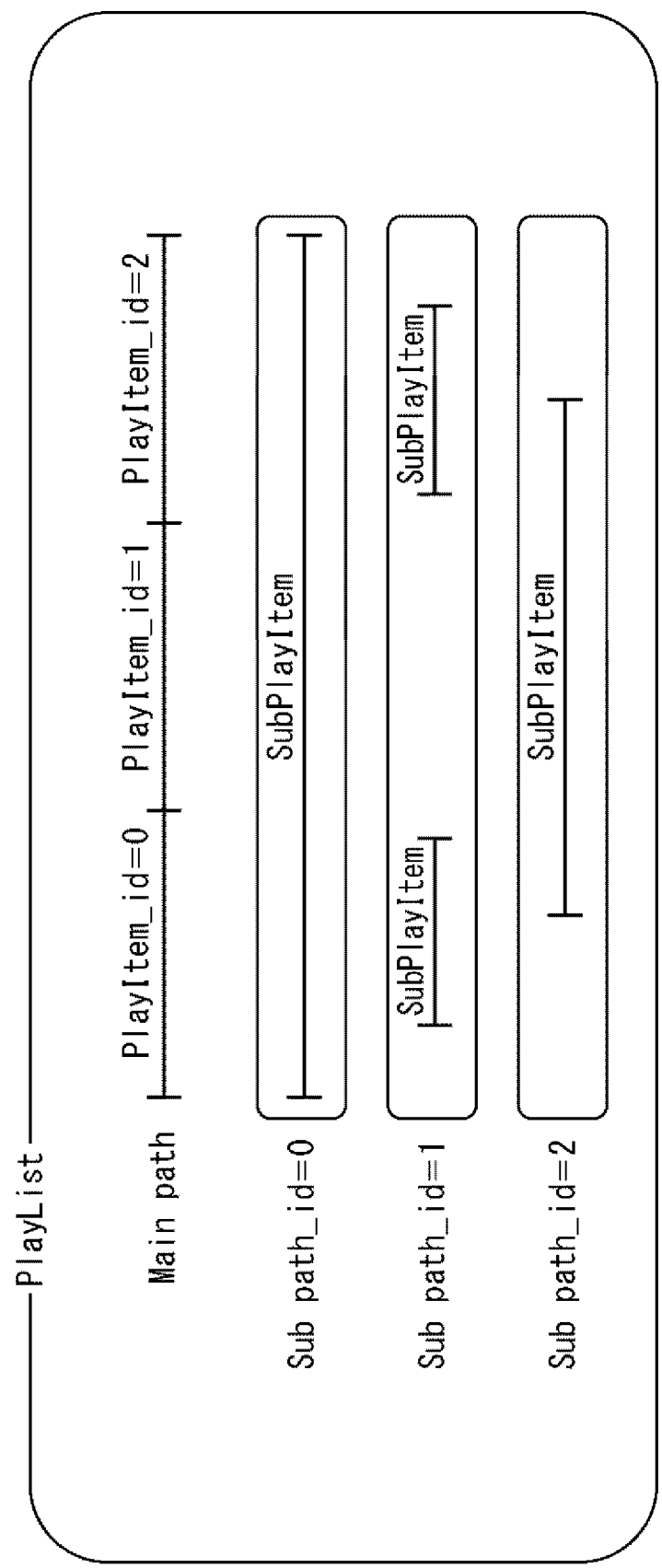
FIG. 11 is a diagram illustrating structures of a Main Path and a Sub Path.

FIG. 11 is a diagram illustrating structures of a Main Path and a Sub Path.

A PlayList has one Main Path and one or more Sub Paths. The PlayList in FIG. 11 has one Main Path and three Sub Paths, the Main Path being created with an array of three PlayItems.

Sequential IDs are given to individual PlayItems included in a Main Path from the beginning. Likewise, sequential IDs, that is, Subpath_id=0, Subpath_id=1, and Subpath_id=2, are given to Sub Paths from the beginning.

In the example in FIG. 11, the Sub Path of Subpath_id=0 includes one SubPlayItem, and the Sub Path of Subpath_id=1 includes two SubPlayItems. Furthermore, the Sub Path of Subpath_id=2 include one SubPlayItem.

The AV stream referenced by a single PlayItem includes at least a video stream. An AV stream may or may not include one or more audio streams to be played back at the same timing as (synchronously with) the video stream included in the AV stream.

An AV stream may or may not include one or more bitmap subtitles (presentation graphic (PG)) streams to be played back synchronously with the video stream included in the AV stream.

An AV stream may or may not include one or more interactive graphic (IG) streams to be played back synchronously with the video stream included in the AV stream. An IG stream is used for displaying graphics such as buttons operated by the user.

In an AV stream referenced by a single PlayItem, a video stream is multiplexed with an audio stream, a PG stream, and an IG stream to be played back synchronously therewith.

Furthermore, a single SubPlayItem references a video stream, an audio stream, a PG stream, or the like in a stream different from the AV stream referenced by a PlayItem.

In this way, an AV stream is played back through the use of a PlayList and Clip Information. Playback control information used for managing playback of an AV stream, namely Index table, PlayList, and Clip Information, is called Data Base information as appropriate.

—Directory Structure

Figure 12:
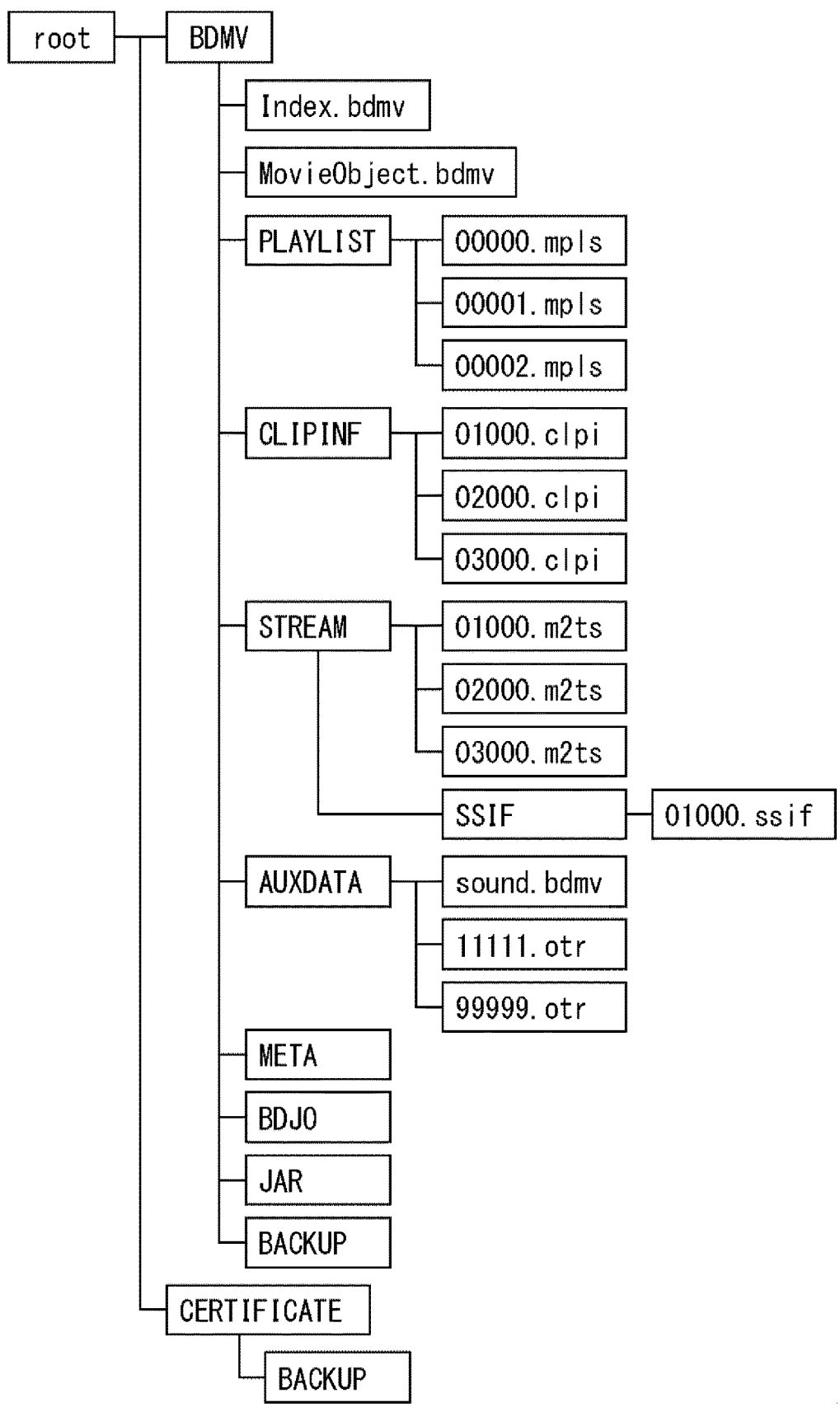
FIG. 12 is a diagram illustrating an example of a file management structure.

FIG. 12 is a diagram illustrating an example management structure for files recorded on the optical disc 11.

Individual files recorded on the optical disc 11 are hierarchically managed in a directory structure. One root directory is created on the optical disc 11.

A BDMV directory is placed under the root directory.

Under the BDMV directory, an Index table file named "Index.bdmv" and a MovieObject file named "MovieObject.bdmv" are stored. An Index table is described in the Index table file.

Under the BDMV directory, a PLAYLIST directory, a CLIPINF directory, a STREAM directory, and others are provided.

The PLAYLIST directory contains PlayList files in which PlayLists are described. Each PlayList file is given a name created by combining a five-digit number with an extension ".mpls". The three PlayList files shown in FIG. 12 are given the file names "00000.mpls", "00001.mpls", and "00002.mpls".

The CLIPINF directory contains Clip Information files. Each Clip Information file is given a name created by combining a five-digit number with an extension ".clpi". The three Clip Information files in FIG. 12 are given the names "01000.clpi", "02000.clpi", and "03000.clpi", respectively.

The STREAM directory contains files of AV streams as described above. Each AV stream file is given a name created by combining a five-digit number with an extension ".m2ts". The three AV stream files in FIG. 12 are given the file names "01000.m2ts", "02000.m2ts", and "03000.m2ts", respectively.

A Clip Information file and an AV stream file that are given the same five-digit number as a file name constitute a single Clip. When the AV stream file "01000.m2ts" is played back, the Clip Information file "01000.clpi" is used. When the AV stream file "02000.m2ts" is played back, the Clip Information file "02000.clpi" is used.

<Configurations of Individual Apparatuses>

—Configuration of Recording Apparatus>

Figure 13:
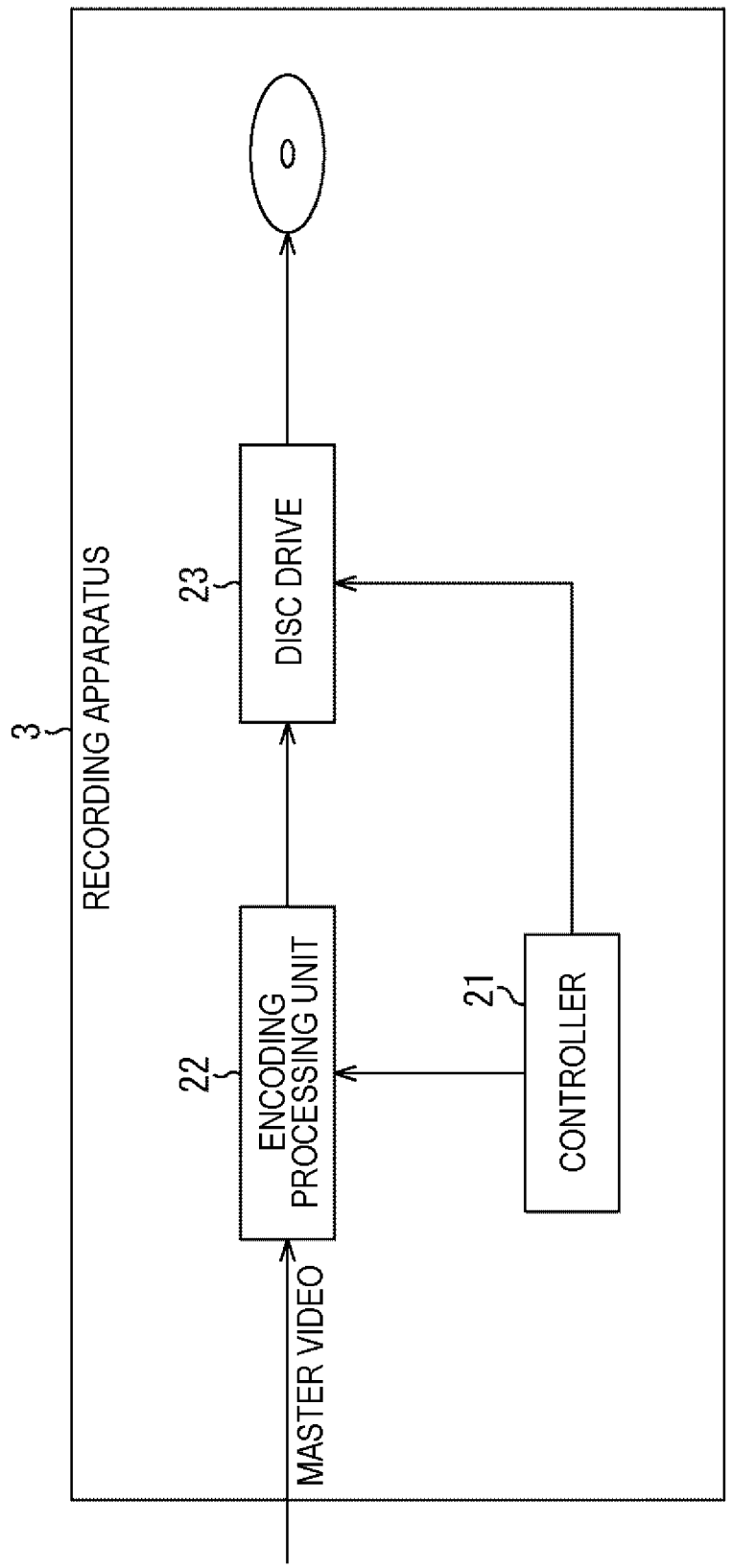
FIG. 13 is a block diagram illustrating an example configuration of a recording apparatus.

FIG. 13 is a block diagram illustrating an example configuration of a recording apparatus 3.

The optical disc 11, which is a BD as described above, is created on the recording apparatus 3 in FIG. 13. The recording apparatus 3 is an apparatus used for authoring of HDR content.

The recording apparatus 3 includes a controller 21, an encoding processing unit 22, and a disc drive 23. A master video is input to the encoding processing unit 22.

The controller 21 includes a central processing unit (CPU), a read only memory (ROM), a random access memory (RAM), and others. The controller 21 executes predetermined programs and controls overall operations of the recording apparatus 3.

The encoding processing unit 22 encodes a master video to generate an HDR video stream. The controller 21 supplies the Dynamic metadata that is to be added to each picture during generation of an HDR stream and is to be encoded into an SEI message.

The encoding processing unit 22 performs the encoding under the constraint that Dynamic metadata is compulsorily added to the picture serving as a random access point.

Furthermore, if appropriate, the encoding processing unit 22 generates an IG stream by encoding a menu image and generates a PG stream by encoding subtitles data. Information including menu images, subtitles data, and the like, is also input to the encoding processing unit 22.

The encoding processing unit 22 generates an AV stream that is to form part of a Clip, by multiplexing the HDR video stream, the IG stream, and the PG stream, which have been obtained through encoding, with an audio stream and others. The encoding processing unit 22 outputs the generated AV stream to the disc drive 23.

In accordance with the directory structure in FIG. 12, the disc drive 23 records individual Data Base information files supplied from the controller 21 and AV stream files supplied from the encoding processing unit 22 onto the optical disc 11.

Figure 14:
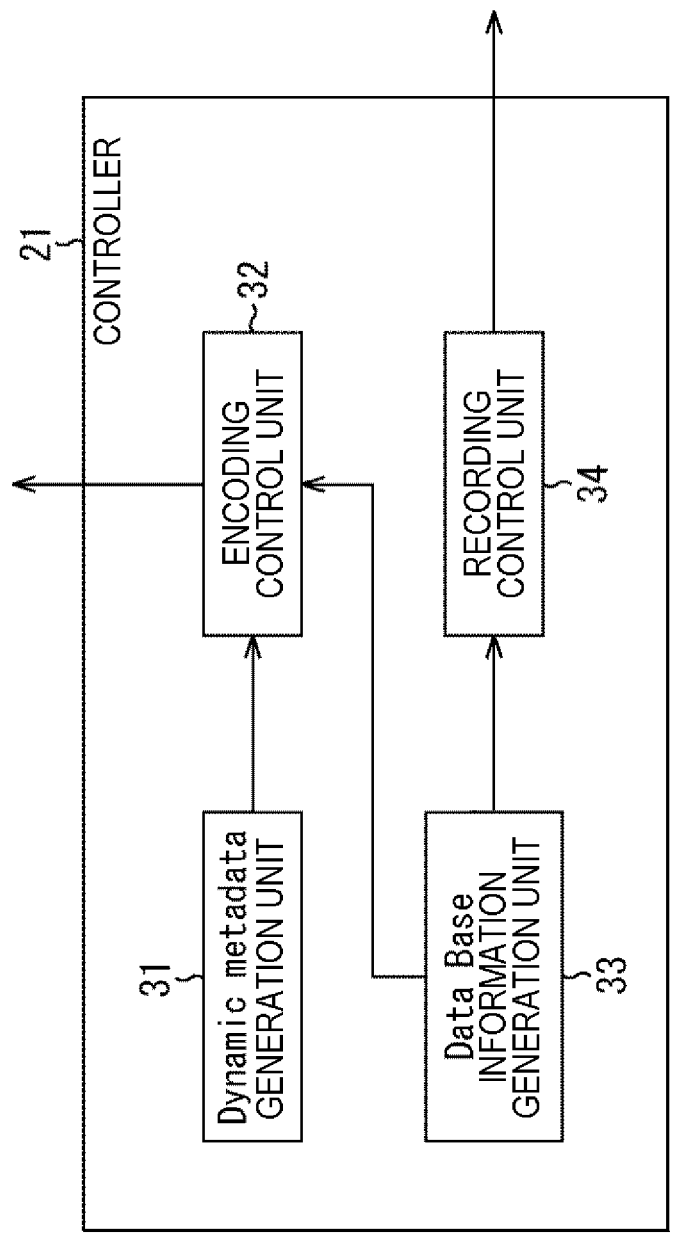
FIG. 14 is a block diagram illustrating an example functional configuration of the controller in FIG. 13.

FIG. 14 is a block diagram illustrating an example functional configuration of the controller 21.

In the controller 21, a Dynamic metadata generation unit 31, an encoding control unit 32, a Data Base information generation unit 33, and a recording control unit 34 are implemented. At least part of the functional units illustrated in FIG. 14 is implemented through execution of a predetermined program, the execution being performed by a CPU in the controller 21.

The Dynamic metadata generation unit 31 sets individual parameters to specific values in accordance with the input provided by the producer of the content and generates Dynamic metadata. The Dynamic metadata generation unit 31 outputs the generated Dynamic metadata to the encoding control unit 32.

The encoding control unit 32 outputs the Dynamic metadata generated by the Dynamic metadata generation unit 31 to the encoding processing unit 22 and causes the encoding processing unit 22 to encode individual pictures in an HDR video. Furthermore, the encoding control unit 32 causes the encoding processing unit 22 to encode menu data and subtitles data.

The Data Base information generation unit 33 generates Data Base information including an Index table, a PlayList, Clip Information, and the like in accordance with the input provided by the producer of the content. The Data Base information generation unit 33 outputs files containing the generated Data Base information to the recording control unit 34. The Data Base information generated by the Data Base information generation unit 33 is supplied, as appropriate, to the encoding control unit 32 so that the Data Base information is used for controlling the encoding.

The recording control unit 34 outputs files containing the Data Base information generated by the Data Base information generation unit 33 to the disc drive 23 and causes the disc drive 23 to record the files on the optical disc 11.

In this way, the recording apparatus 3 functions as an information processing apparatus that generates HDR video streams, by generating Dynamic metadata and performing encoding under the constraint that Dynamic metadata is compulsorily added to the picture serving as a random access point.

—Configuration of Playback Apparatus

Figure 15:
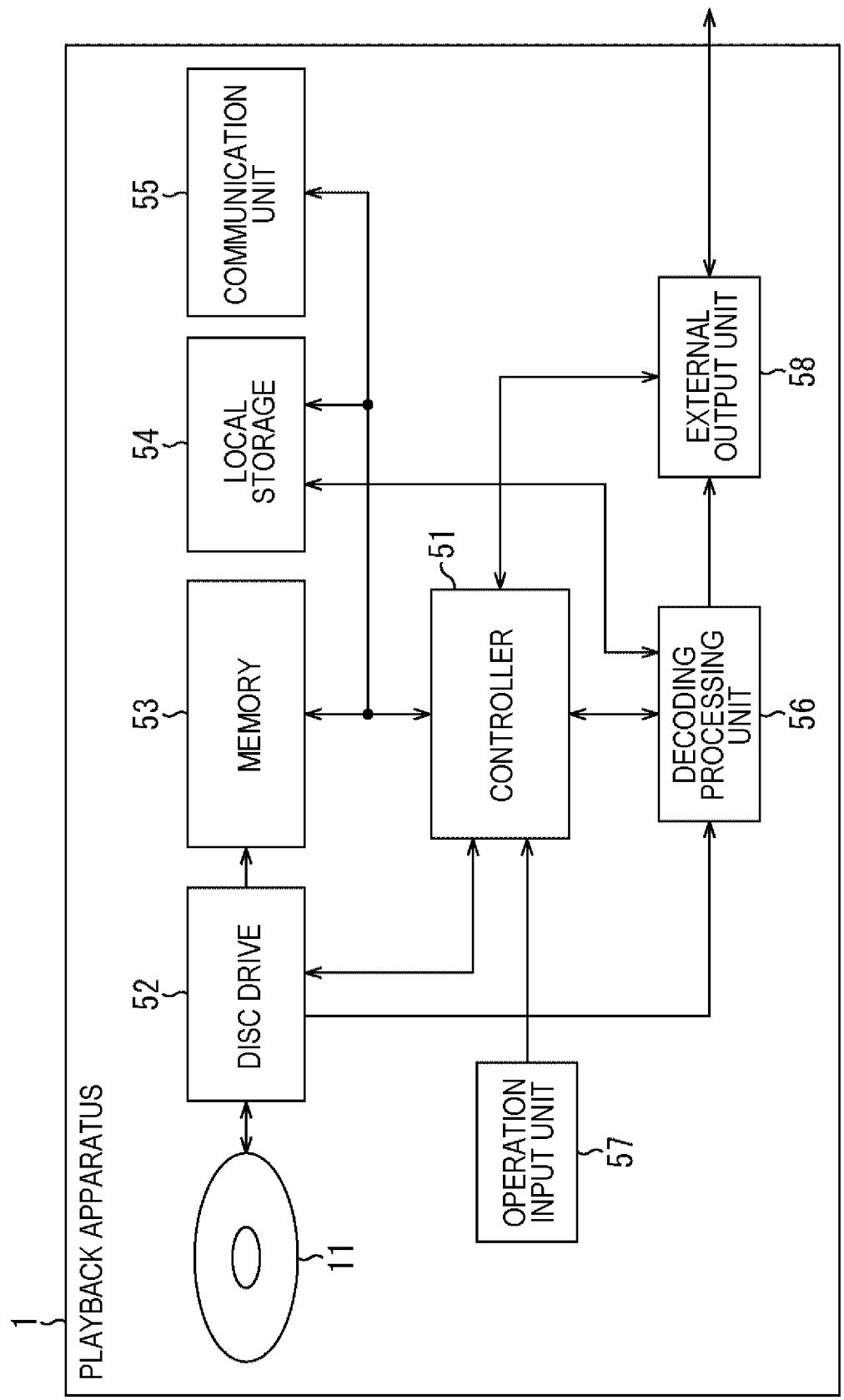
FIG. 15 is a block diagram illustrating an example configuration of a playback apparatus.

FIG. 15 is a block diagram illustrating an example configuration of the playback apparatus 1.

The playback apparatus 1 includes a controller 51, a disc drive 52, a memory 53, a local storage 54, a communication unit 55, a decoding processing unit 56, an operation input unit 57, and an external output unit 58.

The controller 51 includes a CPU, a ROM, a RAM, and the like. The controller 51 executes predetermined programs and controls overall operations of the playback apparatus 1.

The disc drive 52 reads data recorded on the optical disc 11 and outputs the data to the controller 51, the memory 53, or the decoding processing unit 56. For example, the disc drive 52 outputs the Data Base information read from the optical disc 11 to the controller 51, while outputting AV streams to the decoding processing unit 56.

The memory 53 stores data necessary for the controller 51 to execute various processes, such as programs to be executed by the controller 51.

The local storage 54 includes a recording medium such as a hard disk drive (HDD) or a solid state drive (SSD). Streams downloaded from a server and other data are recorded in the local storage 54.

The communication unit 55 is an interface for a wireless LAN, a wired LAN, or the like. For example, the communication unit 55 communicates with a server via a network such as the Internet, and supplies data downloaded from the server to the local storage 54.

The decoding processing unit 56 decodes an HDR video stream multiplexed into the AV stream supplied from the disc drive 52, and outputs the HDR video data obtained through the decoding to the external output unit 58.

Furthermore, the decoding processing unit 56 decodes an audio stream multiplexed into the AV stream, and outputs the audio data obtained through the decoding to the external output unit 58. Although the description focuses on video playback, the HDR content played back by the playback apparatus 1 includes audio data as well.

The operation input unit 57 includes an input device, such as a button or a touch panel, and a receiving unit that receives signals, such as infrared signals transmitted from a remote controller. The operation input unit 57 detects a user operation and supplies a signal representing specifics of the detected operation to the controller 51.

The external output unit 58 is an interface for external output such as HDMI. The external output unit 58 communicates with the TV 2 via an HDMI cable, and acquires information regarding performance capabilities of the display included in the TV 2 and outputs the information to the controller 51. Furthermore, the external output unit 58 receives HDR video data supplied from the decoding processing unit 56 and outputs the data to the TV 2.

—Configuration of TV

Figure 16:
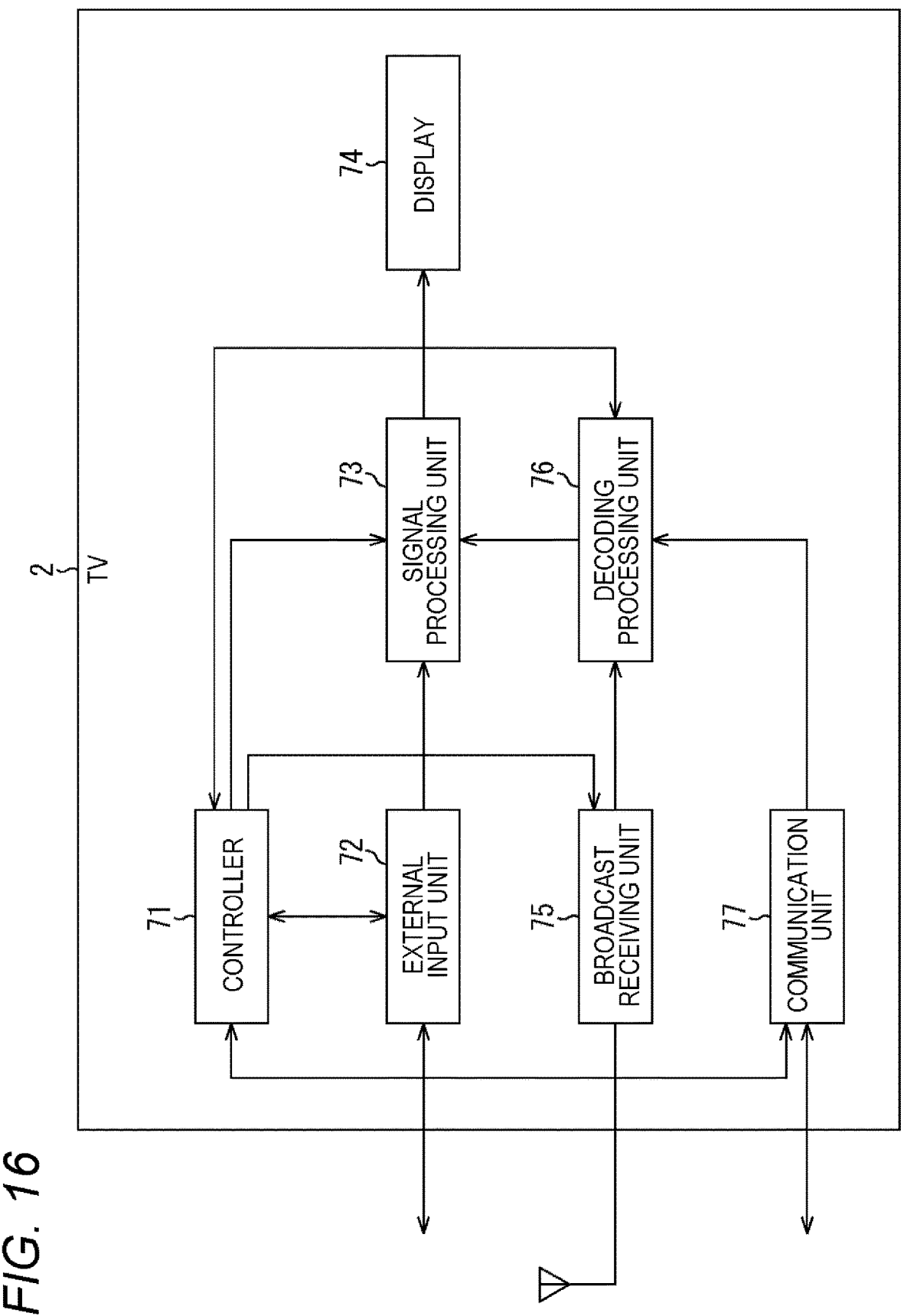
FIG. 16 is a block diagram illustrating an example configuration of a TV.

FIG. 16 is a block diagram illustrating an example configuration of the TV 2.

The TV 2 includes a controller 71, an external input unit 72, a signal processing unit 73, a display 74, a broadcast receiving unit 75, a decoding processing unit 76, and a communication unit 77.

The controller 71 includes a CPU, a ROM, a RAM, and the like. The controller 71 executes predetermined programs and controls overall operations of the TV 2.

For example, the controller 71 manages the information indicating performance capabilities of the display 74. During HDMI transmission configuration, the controller 71 outputs the information indicating performance capabilities of the display 74 to the external input unit 72 to send the information to the playback apparatus 1.

Furthermore, the controller 71 controls the signal processing unit 73 to perform processing of an HDR video. For example, the controller 71 causes the signal processing unit 73 to perform luminance compression on an HDR video on the basis of the Dynamic metadata transmitted from the playback apparatus 1 during playback of the HDR content.

The external input unit 72 is an interface for external input such as HDMI. The external input unit 72 communicates with the playback apparatus 1 via an HDMI cable, and receives data representing individual pictures in an HDR video transmitted from the playback apparatus 1 and outputs the data to the signal processing unit 73. Furthermore, the external input unit 72 receives the Dynamic metadata transmitted along with each picture in an HDR video and outputs the Dynamic metadata to the controller 71.

The signal processing unit 73 performs processing of the HDR video supplied from the external input unit 72 so that video images are shown on the display 74. The signal processing unit 73 performs luminance compression on the HDR video, as appropriate, under the control of the controller 71 so that the luminance falls within a range of display capabilities of the display 74.

The signal processing unit 73 also performs, for example, a process of causing the display 74 to display video images of a broadcast program on the basis of the data supplied form the decoding processing unit 76.

The display 74 is a display device such as an organic electroluminescence (EL) display or a liquid crystal display (LCD). The display 74 displays video images of HDR content, video images of a broadcast program, and so on, on the basis of video signals supplied from the signal processing unit 73.

The broadcast receiving unit 75 extracts broadcast signals of a predetermined channel from the signals supplied from an antenna and outputs the broadcast signals to the decoding processing unit 76. The broadcast receiving unit 75 extracts the broadcast signals under the control of the controller 71.

The decoding processing unit 76 performs processing such as decoding of the broadcast signals supplied from the broadcast receiving unit 75 and outputs video data for a broadcast program to the signal processing unit 73.

The communication unit 77 is an interface for a wireless LAN, a wired LAN, or the like. The communication unit 77 communicates with a server via the Internet.

<Operations of Individual Apparatuses>

—Operations of Recording Apparatus

Figure 17:
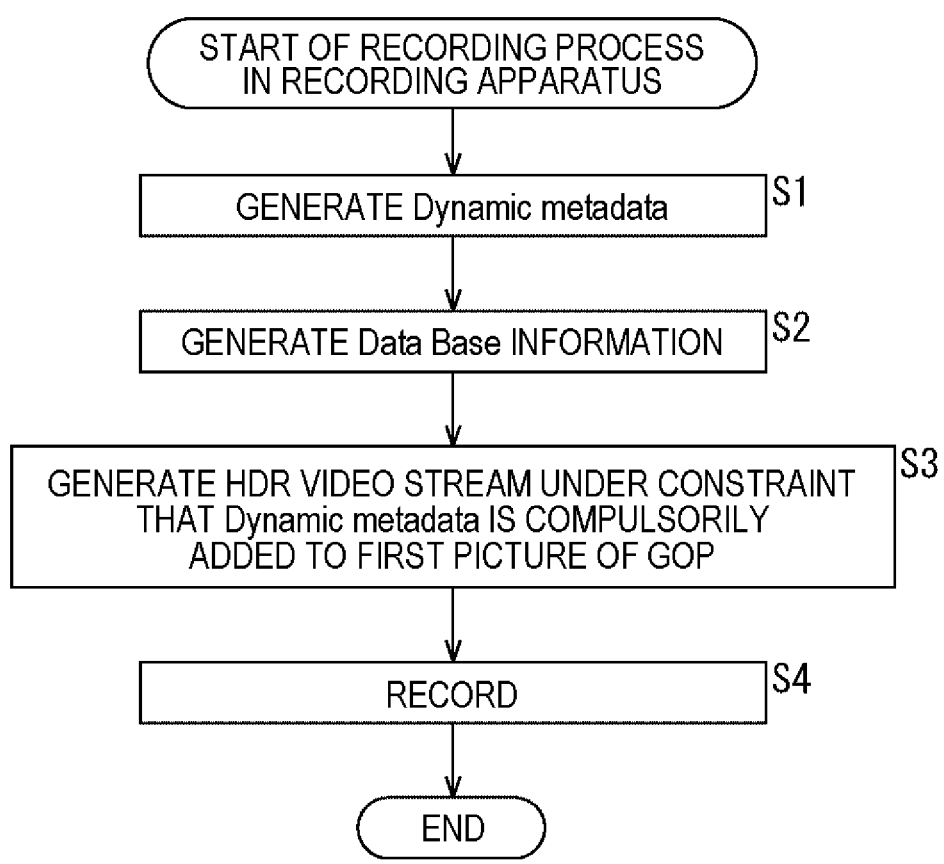
FIG. 17 is a flowchart explaining a recording process in a recording apparatus.

Referring to the flowchart in FIG. 17, the following describes a recording process in the recording apparatus 3.

The process in FIG. 17 is started when, for example, the video data serving as a master is input.

In step S1, the Dynamic metadata generation unit 31 in the controller 21 sets individual parameters to specific values in accordance with the input provided by the producer of the content and generates Dynamic metadata.

In step S2, the Data Base information generation unit 33 generates Data Base information such as a PlayList.

In step S3, the encoding processing unit 22 encodes the master video under the control of the encoding control unit 32 and under the constraint that Dynamic metadata is compulsorily added to the first picture of a GOP, the first picture serving as a random access point, and generates an HDR video stream.

Furthermore, the encoding processing unit 22 encodes a menu image and subtitles data to generate an IG stream and a PG stream. The encoding processing unit 22 generates an AV stream by multiplexing the generated streams.

In step S4, the disc drive 23 generates the optical disc 11 by recording a file of the Data Base information supplied from the controller 21 and a file of the AV stream supplied from the encoding processing unit 22. Thereafter, the process is exited.

The foregoing process allows the recording apparatus 3 to generate an HDR video stream in which Dynamic metadata is added to the first picture of a GOP, the first picture serving as a random access point, and to provide HDR content including such HDR video stream.

—Operations of Playback Apparatus

Figure 18:
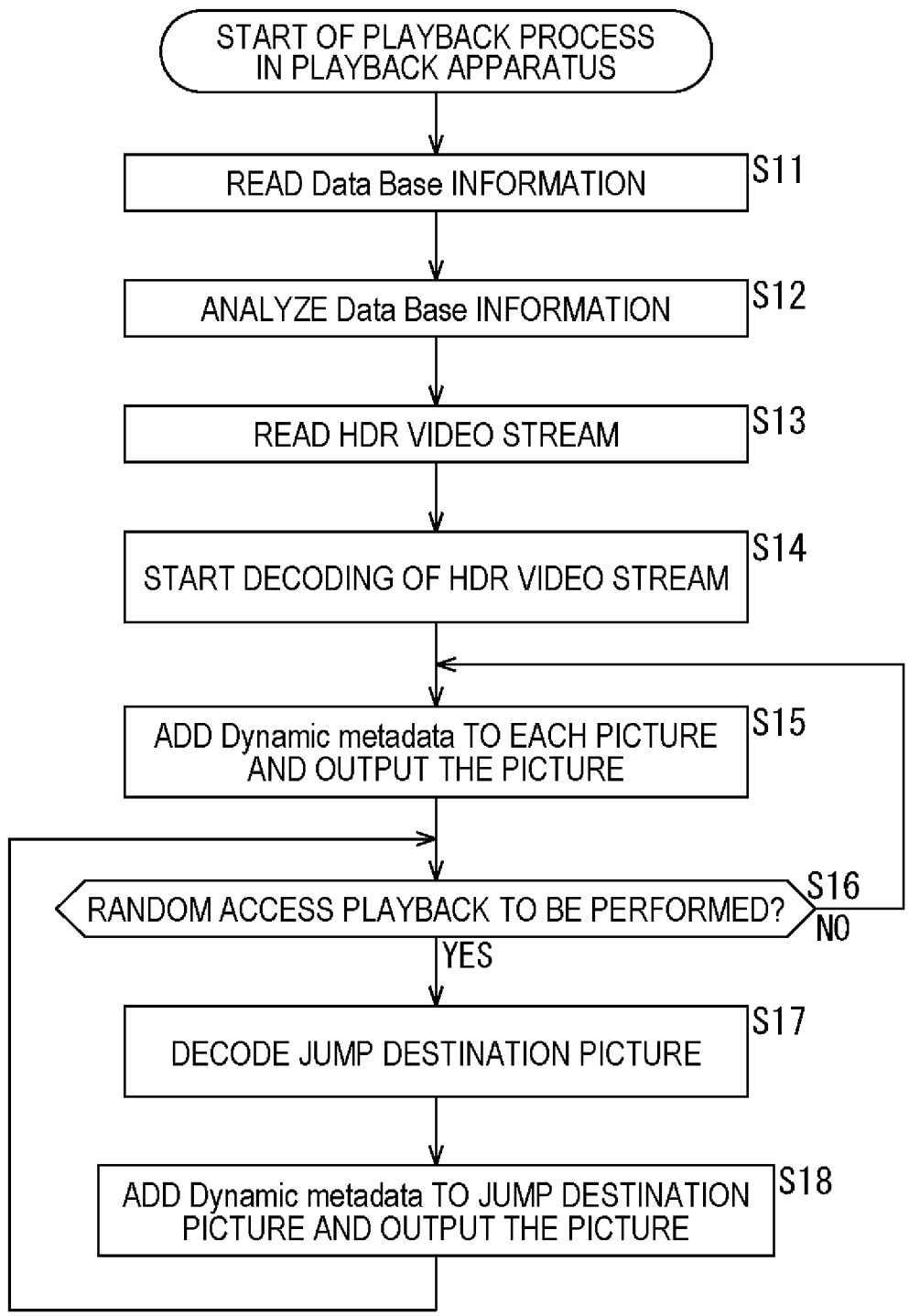
FIG. 18 is a flowchart explaining a playback process in a playback apparatus.

Next, referring to the flowchart in FIG. 18, the following describes a process in the playback apparatus 1 for playing back the HDR content.

The process in FIG. 18 is started when, for example, the optical disc 11 is loaded into the disc drive 52 in the playback apparatus 1 and an instruction to play back the HDR content is given.

In step S11, the disc drive 52 reads Data Base information files including a PlayList file from the optical disc 11.

In step S12, the controller 51 analyzes the PlayList file to, for example, identify the AV stream to be played back.

In step S13, the disc drive 52 reads, from the optical disc 11, the AV stream file that includes the HDR video stream to be played back.

In step S14, the decoding processing unit 56 decodes the HDR video stream included in the AV stream supplied from the disc drive 52, and outputs each picture data piece to the external output unit 58. The Dynamic metadata added to each picture is supplied from the decoding processing unit 56 to the controller 51.

In step S15, the external output unit 58 adds the Dynamic metadata supplied from the controller 51 to each individual picture in the HDR video supplied from the decoding processing unit 56, and outputs the resulting picture to the TV 2. In the TV 2, luminance compression on each picture is performed on the basis of the Dynamic metadata, and the pictures that have undergone luminance compression are displayed.

In step S16, the controller 51 determines whether or not random access playback is to be performed. If it is determined in step S16 that random access playback is not to be performed, the processing returns to step S15 to continue normal playback in which pictures are played back in sequence.

On the other hand, if it is determined in step S16 that random access playback is to be performed, the processing goes to step S17. For example, if an instruction to perform fast-forward playback/rewind playback is given by the user, or if an instruction to perform cueing playback is given by the user, it is determined in step S16 that random access playback is to be performed.

In step S17, the decoding processing unit 56 decodes the jump destination picture, which serves as a random access point. The picture decoded in this step is the first picture of a GOP and Dynamic metadata is added to the first picture. The Dynamic metadata included in the SEI for the decoded picture is supplied to the controller 51.

In step S18, the external output unit 58 adds the Dynamic metadata supplied from the controller 51 to the picture serving as a random access point, and outputs the resulting picture to the TV 2.

Thereafter, the processing returns to step S16 to repeat the foregoing process steps. For example, in a case where the random access playback indicated by the user is fast-forward playback/rewind playback, the first pictures in their respective GOPs are played back sequentially and are output along with Dynamic metadata. For example, when the playback of the HDR content is finished, the process in FIG. 18 is exited.

As described above, Dynamic metadata is compulsorily added to the picture serving as a random access point. Therefore, even when random access playback is to be performed, it is made possible to prevent the jump destination picture from undergoing luminance compression in a manner not intended by the producer of the HDR content.

<Example in which Dynamic Metadata is Compulsorily Added to Picture Specified by EP_Map>

Clip Information as included in Data Base information includes the information called EP_map, which specifies a random access point.

HDR video data may be encoded in such a way that Dynamic metadata is compulsorily added to the picture corresponding to the random access point specified by EP_map.

Figure 19:
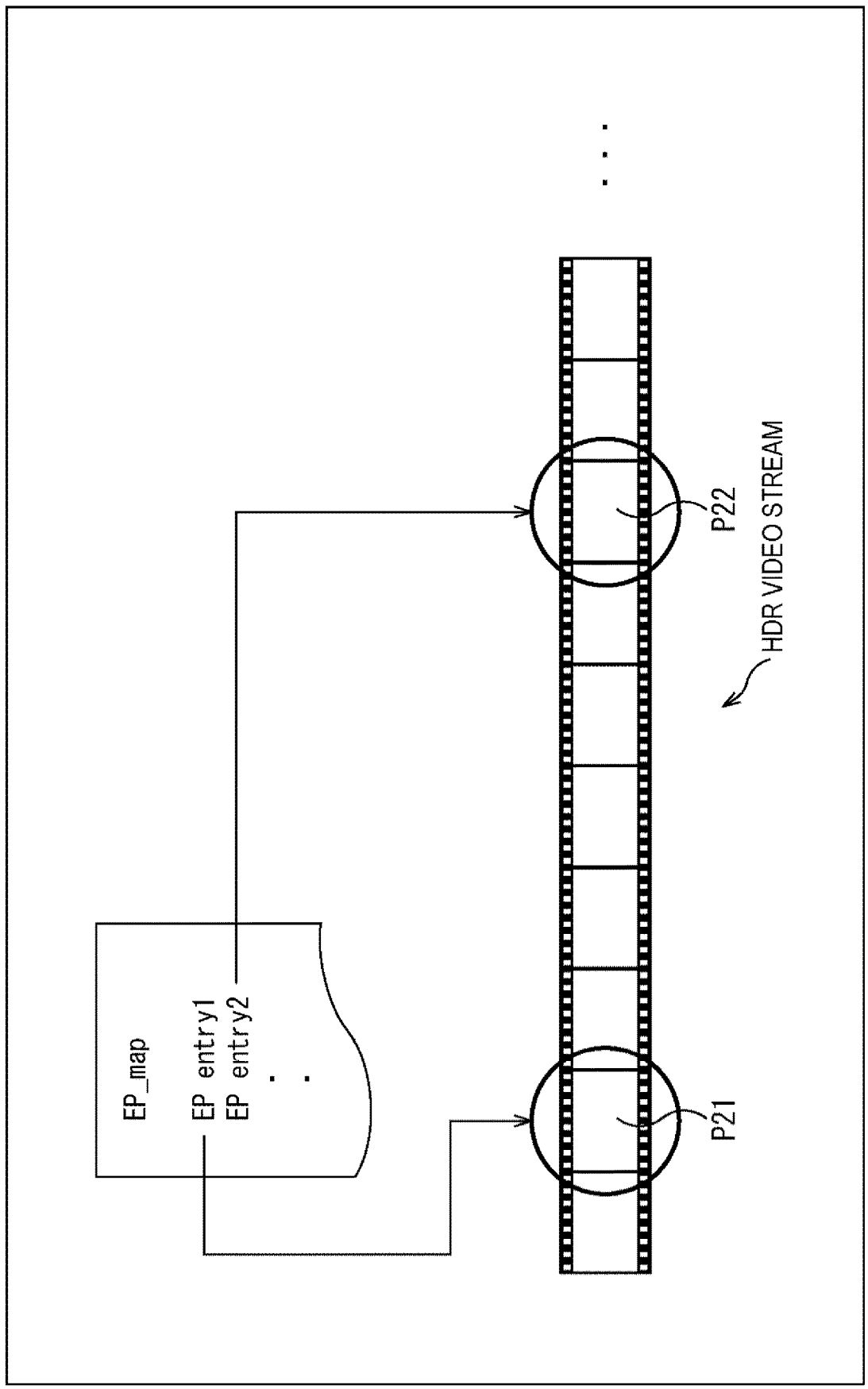
FIG. 19 is a diagram illustrating an example of an HDR video stream.

FIG. 19 is a diagram illustrating an example HDR video stream including a picture specified by EP_map as a random access point.

EP_map shown in the upper part of FIG. 19 contains descriptions about information regarding entry points (random access points): EP entry1 and EP entry2. Each of EP entry1 and EP entry2 is the information indicating the presentation time stamp (PTS) of the entry point and the position of the entry point expressed by a source packet number (SPN) on an HDR video stream.

In the example in FIG. 19, a picture P21 is specified by EP entry1 and a picture P22 is specified by EP entry2. Among the pictures included in an HDR video stream, Dynamic metadata is added to at least the picture P21 and the picture P22, which are specified by EP entry1 and EP entry2, respectively.

For example, when an instruction to perform cueing playback starting from a certain entry point is given, the playback apparatus 1 outputs the picture specified by EP entry to the TV 2 along with the Dynamic metadata added to the picture.

In the TV 2, luminance compression on the picture specified by EP entry is performed on the basis of the Dynamic metadata transmitted along with the picture. The picture that has undergone luminance compression is displayed, whereby the cueing playback is fulfilled.

In this way, Dynamic metadata may be compulsorily added to the picture specified by EP_map included in Clip Information, which is the information in a file separate from HDR video streams. Therefore, it is made possible to prevent the jump destination picture from undergoing luminance compression in a manner not intended by the producer of the HDR content.

Note that the HDR content created by multiplexing according to MP4 may be played back by the playback apparatus 1.

The HDR content created by multiplexing according to MP4 includes an HDR video stream obtained by encoding HDR video data according to a certain encoding method such as AVC or HEVC, and also includes a movie fragment random access box (mfra), which is playback control information for an HDR video stream.

Information indicating a random access point is included in mfra. Among HDR video stream pictures included in MP4 HDR content, Dynamic metadata is added to at least the picture specified by the information included in mfra. Therefore, it is also made possible to prevent the jump destination picture from undergoing luminance compression in a manner not intended by the producer of the HDR content.

Such HDR content in the MP4 format is also generated by an information processing apparatus having a configuration similar to the configuration illustrated in FIGS. 13 and 14. For example, an HDR video stream generated by the encoding processing unit 22 is multiplexed with mfra generated by the Data Base information generation unit 33 in accordance with the MP4 format, whereby HDR content is generated.

<About EP_Map in Clip Information>

FIG. 20 is a diagram showing the syntax of Clip Information. The following describes major descriptions included in Clip Information.

As shown in FIG. 20, Clip information includes descriptions of ClipInfo( ), SequenceInfo( ), ProgramInfo( ), CPI( ), ClipMark( ), and ExtensionData( ), respectively.

ClipInfo( ) is a field in which information regarding attributes of an AV stream to be played back using Clip Information is described.

SequenceInfo( ) is a field in which information regarding a sequence of source packets included in an AV stream is described.

ProgramInfo( ) is a field in which information regarding a sequence of source packets included in a program is described.

CPI( ) is a field in which information indicating a correspondence relationship between time and position of an AV stream is described. A description of EP_map is also included in CPI( ).

FIG. 21 is a diagram showing the syntax of CPI( ).

As shown in FIG. 21, CPI( ) includes descriptions of CPI_type and EP_map( ).

If the value of CPI_type is 1, CPI( ) includes information regarding EP_map.

FIG. 22 is a diagram showing the syntax of EP_map( ).

stream_PID represents the PID of a TS packet storing HDR video data.

number_of_EP_coarse_entries represents the number of EP-coarse-entries included in EP_map( ). An EP-coarse-entry is information regarding an entry point with coarse accuracy in units of seconds, for example.

number_of_EP_fine_entries represents the number of EP-fine-entries included in EP_map( ). An EP-fine-entry is information regarding an entry point with higher accuracy than EP-coarse-entries. An entry point is specified by a set of an EP-coarse-entry and an EP-fine-entry.

EP_map_for_one_stream_PID includes information regarding the respective EP-coarse-entries and EP-fine-entries.

FIG. 23 is a diagram showing the syntax of EP_map_for_one_stream_PID.

PTS_EP_coarse[i] represents the PTS (time) of an EP-coarse-entry.

SPN_EP_coarse [i] represents the source packet (position) on an HDR video stream corresponding to PTS_EP_coarse [i].

PTS_EP_fine [i] represents the PTS of an EP-fine-entry.

SPN_EP_fine[i] represents the source packet on an HDR video stream corresponding to PTS_EP_fine[i].

In the case of performing random access playback based on EP_map, the playback apparatus 1 analyzes EP_map_for_one_stream_PID to perform processes including the process of identifying the position of the source packet on an HDR video stream, the source packet containing the picture data serving as an entry point, for example. As described above, Dynamic metadata is added to the picture serving as an entry point.

<Operations of Recording Apparatus>

Figure 24:
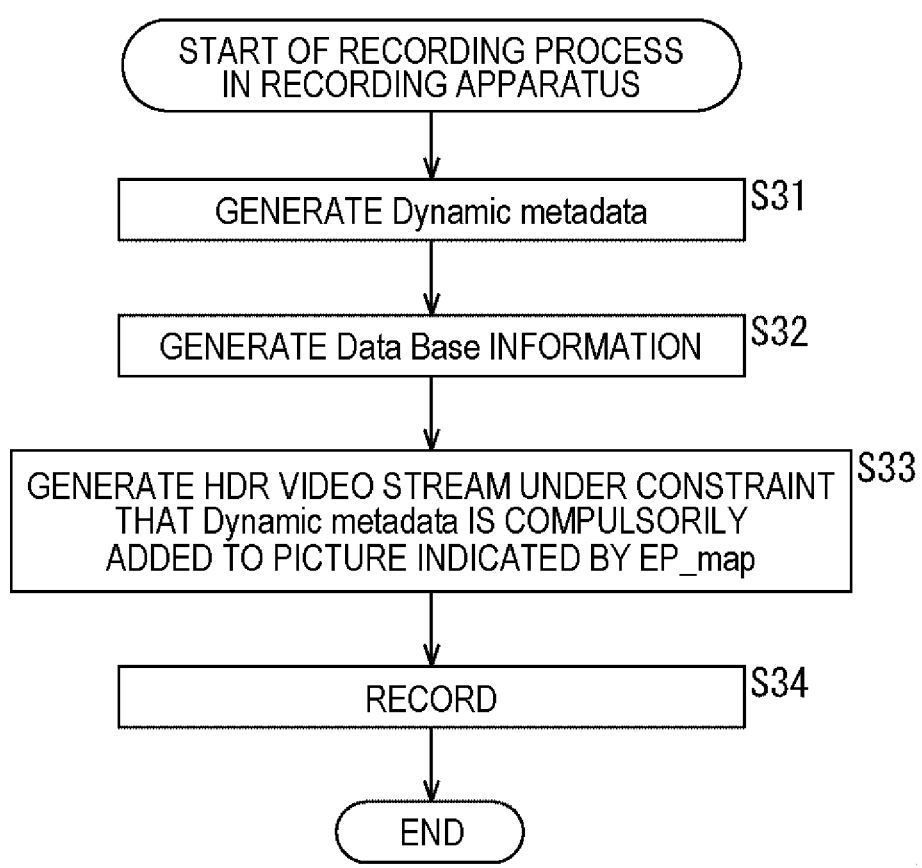
FIG. 24 is a flowchart explaining a recording process in a recording apparatus.

Referring to the flowchart in FIG. 24, the following describes a recording process in the recording apparatus 3 for adding Dynamic metadata to the picture serving as an entry point as specified by EP_map to generate an HDR video stream.

The process in FIG. 24 is similar to the process described with reference to FIG. 17 except that the constraint on the encoding of a master video is different. Duplicate descriptions are omitted as appropriate.

Specifically, in step S31, the Dynamic metadata generation unit 31 in the controller 21 sets individual parameters to specific values in accordance with the input provided by the producer of the content and generates Dynamic metadata.

In step S32, the Data Base information generation unit 33 generates Data Base information including a PlayList, Clip Information containing descriptions of EP_map, and the like. The Data Base information generation unit 33 outputs information regarding each entry point (EP entry) described in EP_map to the encoding control unit 32.

In step S33, the encoding processing unit 22 encodes the master video under the control of the encoding control unit 32 and under the constraint that Dynamic metadata is compulsorily added to the picture serving as the entry point specified by EP_map, and generates an HDR video stream.

In step S34, the disc drive 23 generates the optical disc 11 by recording a file of the Data Base information supplied from the controller 21 and a file of the AV stream supplied from the encoding processing unit 22. Thereafter, the process is exited.

The foregoing process allows the recording apparatus 3 to generate an HDR video stream in which Dynamic metadata is added to the picture serving as the random access point specified by EP_map, and to provide HDR content including such HDR video stream.

<Modifications>

The foregoing describes the case where Dynamic metadata is added to the first picture of a GOP and the case where Dynamic metadata is added to the picture specified by EP_map, but these constraints may be used in combination.

In other words, an HDR video stream can be encoded in such a way that Dynamic metadata is compulsorily added to both the first picture of a GOP and the picture specified by EP_map.

In a case where no Dynamic metadata is added to the jump destination picture, the Dynamic metadata added to a picture near the jump destination picture may be transmitted from the playback apparatus 1 to the TV 2 and used for luminance compression on the jump destination picture.

Second Embodiment (Example in which Default Metadata is Used)

<Example in which Default Metadata is Used During Random Access Playback>

Figure 25:
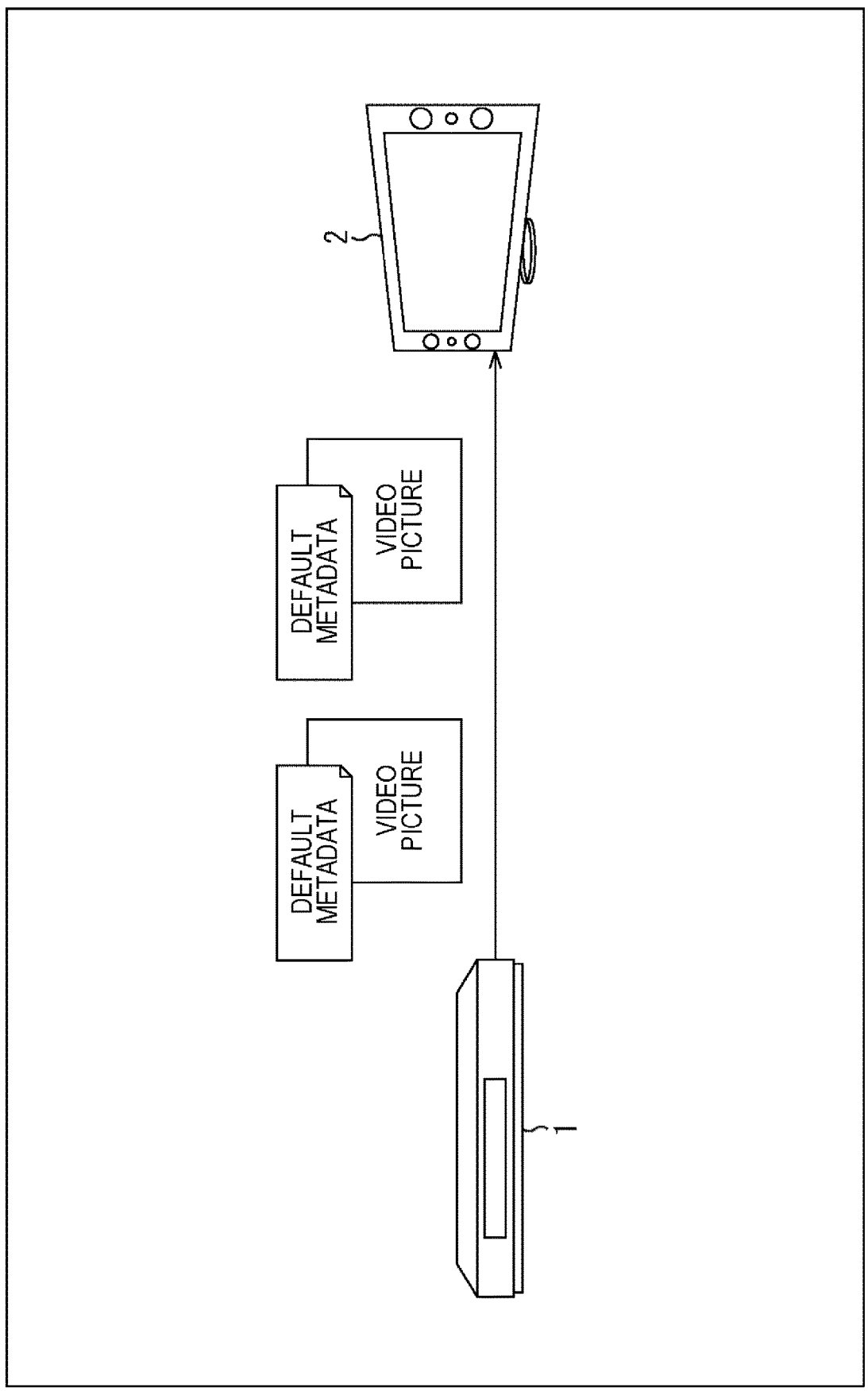
FIG. 25 is a diagram illustrating an example of metadata transmission occurring during random access playback.

FIG. 25 is a diagram illustrating an example of metadata transmission occurring during random access playback.

During random access playback, an OSD image representing specifics of the random access playback is combined with, for example, the jump destination picture in the playback apparatus 1. The picture combined with the OSD image is output to the TV 2 along with default metadata, which is the metadata to be used during random access playback as shown in FIG. 25, instead of Dynamic metadata.

The default metadata has parameters similar to parameters of Dynamic metadata, such as the parameters described with reference to FIG. 3. Individual parameters of the default metadata are set to fixed values for, for example, displaying various types of OSD images with suitable luminance. The default metadata is prepared in the playback apparatus 1 in advance in such a manner as, for example, stored in the memory 53 in the playback apparatus 1.

Figure 26:
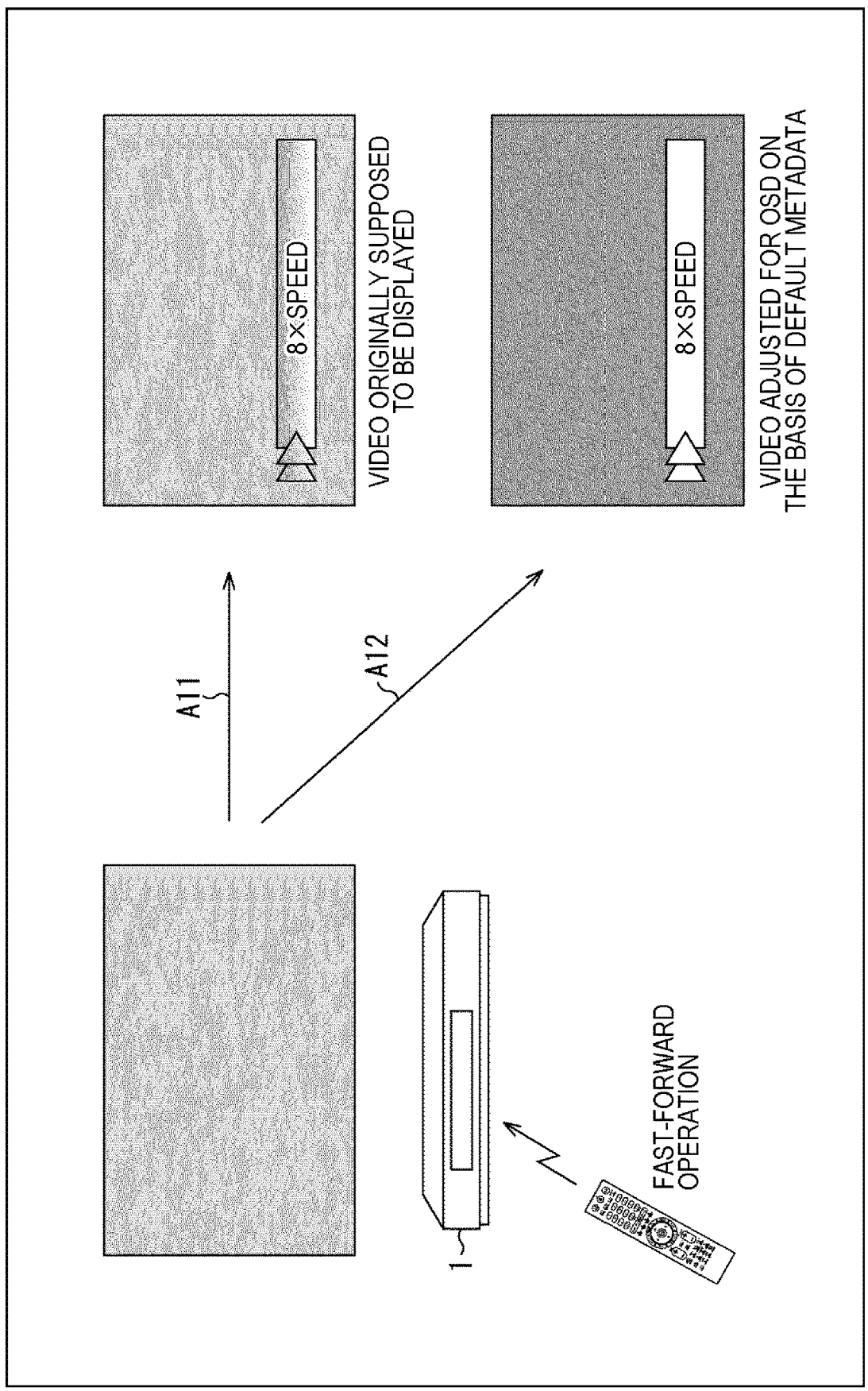
FIG. 26 is a diagram illustrating displays subsequent to luminance compression.

FIG. 26 is a diagram illustrating displays subsequent to luminance compression.

For example, in a case where an instruction to perform random access playback such as fast-forward playback is given when a scene with higher luminance is being displayed as shown on the left side of FIG. 26, the default metadata is output to the TV 2 along with the jump destination picture combined with an OSD image.

In the TV 2, luminance compression is performed on the picture combined with the OSD image on the basis of the default metadata that has been transmitted from the playback apparatus 1, resulting in the HDR video with lowered luminance as indicated by the head of the arrow A12. In other words, supposing that the HDR video would have the original luminance indicated by the head of the arrow A11 after luminance compression is performed on the basis of Dynamic metadata, the actually displayed HDR video is darker than that with the original luminance.

Since suitable values for OSD images are set in the metadata, the OSD image itself has suitable luminance as indicated by the head of the arrow A12 as a result of the luminance compression performed with the default metadata.

In this way, during random access playback, the default metadata is used for luminance compression on the jump destination picture, and thus OSD images in the individual pictures have a constant level of luminance, whereby it is made possible to prevent OSD images from appearing to be blinking.

—Configuration and Operations of Playback Apparatus

Figure 27:
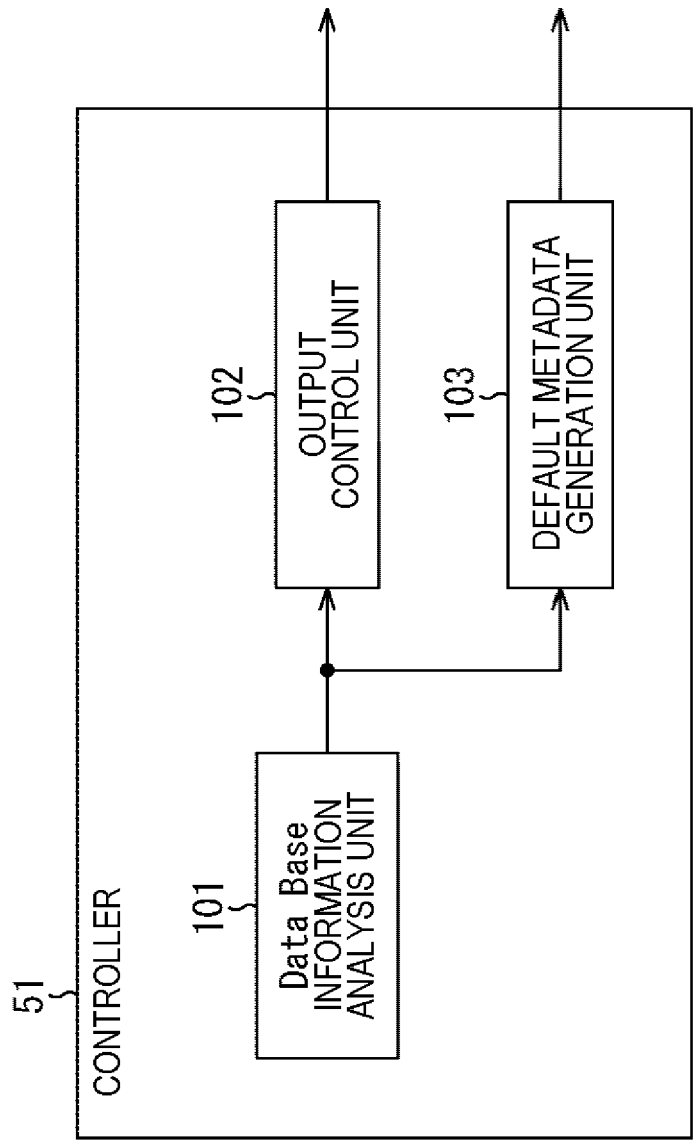
FIG. 27 is a block diagram illustrating an example functional configuration of the controller in FIG. 15.

FIG. 27 is a block diagram illustrating an example functional configuration of the controller 51 applied to the case where default metadata is transmitted during random access playback. The configuration of the playback apparatus 1 is the same as the configuration in FIG. 15.

In the controller 51, a Data Base information analysis unit 101, an output control unit 102, and a default metadata generation unit 103 are implemented. At least part of the functional units illustrated in FIG. 27 is implemented by executing a predetermined program, the executing performed by a CPU in the controller 51.

The Data Base information analysis unit 101 analyzes the Data Base information supplied from the disc drive 52 and outputs information representing the analysis result to the output control unit 102 and to the default metadata generation unit 103. The output control unit 102 and the default metadata generation unit 103 perform their respective processes by referencing the result of analysis of the Data Base information as appropriate.

The output control unit 102 controls output of the HDR video by controlling the decoding processing unit 56 and the external output unit 58.

For example, the output control unit 102 causes the decoding processing unit 56 to decode HDR video streams. Furthermore, the output control unit 102 controls the external output unit 58 to add Dynamic metadata to each picture obtained by decoding HDR video streams and to output the resulting picture.

When an instruction to perform random access playback is given, the output control unit 102 causes the decoding processing unit 56 to decode an HDR video stream and to combine the jump destination picture with an OSD image. Furthermore, the output control unit 102 controls the external output unit 58 to add default metadata to the picture combined with the OSD image and to output the resulting picture.

The default metadata generation unit 103 generates default metadata by setting fixed values as the values of individual parameters. The default metadata generation unit 103 has information regarding the fixed values to be set for the individual parameters. The default metadata generation unit 103 outputs the generated default metadata to, and have the default metadata stored in, the memory 53.

In this way, the default metadata may be generated in the playback apparatus 1. Alternatively, the default metadata may be stored in the memory 53 at a time when, for example, the playback apparatus 1 is manufactured so as to be prepared in the playback apparatus 1 in advance.

Alternatively, the user may be allowed to specify the values to be set for individual parameters of the default metadata. In this case, values of individual parameters are set by using, for example, the setting screen on the playback apparatus 1.

Furthermore, the user may be allowed to select whether the default metadata transmitted from the playback apparatus 1 is to be referenced or ignored on the TV 2 side. In this case, for example, the setting screen on the TV 2 is used to specify whether to reference or ignore the default metadata.

Values to be set for individual parameters of the default metadata may be allowed to be obtained from a server.

In this case, information regarding values to be set for individual parameters of the default metadata is prepared in the server in such a way that, for example, the information is associated with the HDR content recorded on the optical disc 11. The default metadata generation unit 103 generates the default metadata for the HDR content recorded on the optical disc 11 by setting the values obtained from the server as the values of individual parameters.

Furthermore, the default metadata may be allowed to be downloaded from the server. After downloaded and received by the communication unit 55, the default metadata is output to and stored in the memory 53.

Figure 28:
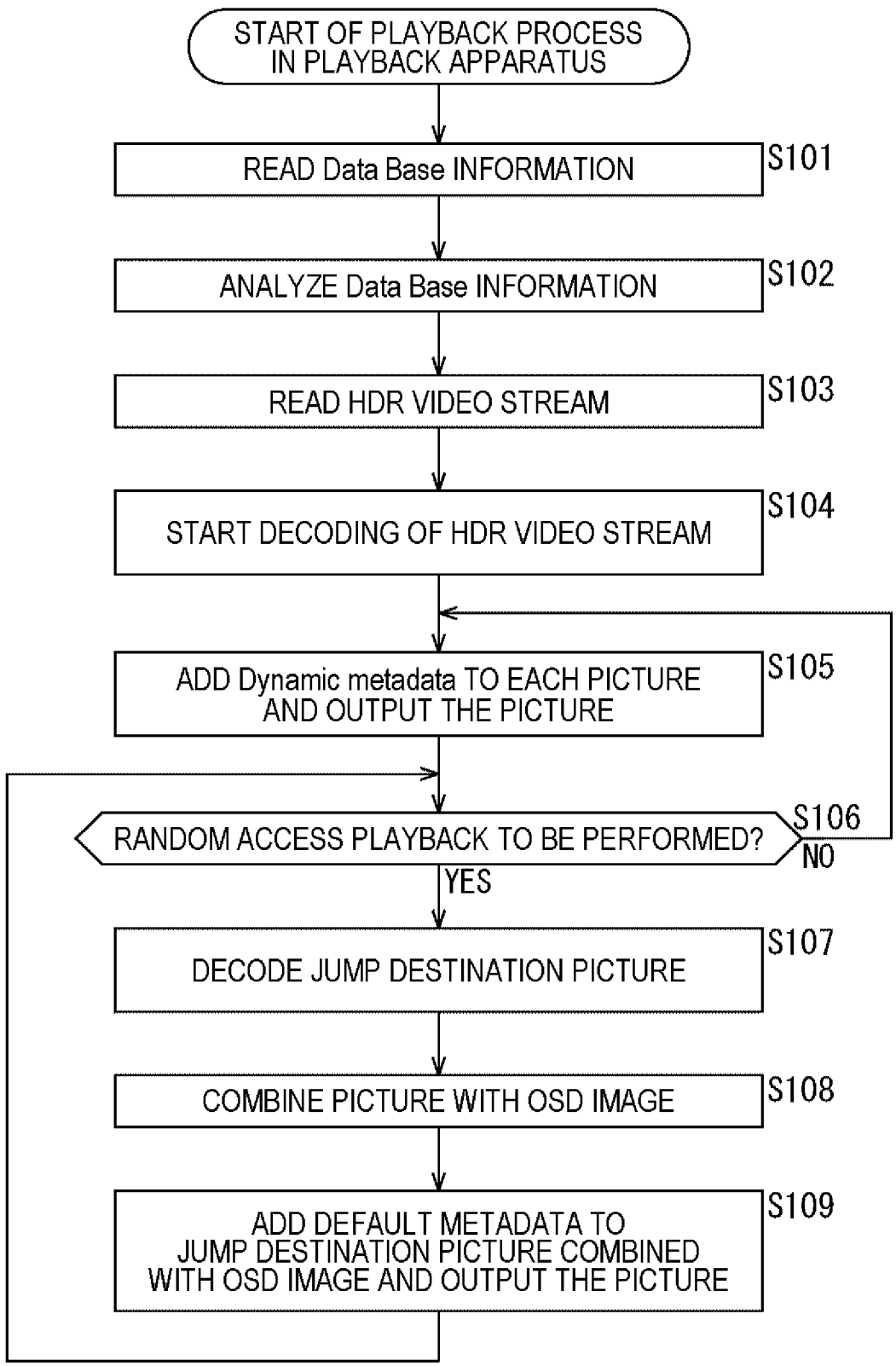
FIG. 28 is a flowchart explaining another playback process in a playback apparatus.

Next, referring to the flowchart in FIG. 28, the following describes a process in the playback apparatus 1 that plays back HDR content in such a way that default metadata is transmitted during random access playback.

The process in FIG. 28 is basically similar to the process described with reference to FIG. 18 except that different metadata is added to each picture when an instruction to perform random access playback is given.

Specifically, in step S101, the disc drive 52 reads Data Base information files including a PlayList file from the optical disc 11.

In step S102, the Data Base information analysis unit 101 in the controller 51 analyzes the PlayList file to, for example, identify the AV stream to be played back.

In step S103, the disc drive 52 reads, from the optical disc 11, the AV stream file that includes the HDR video stream to be played back.

In step S104, the decoding processing unit 56 decodes the HDR video stream included in the AV stream supplied from the disc drive 52, and outputs each picture data piece to the external output unit 58. The Dynamic metadata included in the HDR video stream is supplied from the decoding processing unit 56 to the controller 51.

In step S105, under the control of the output control unit 102, the external output unit 58 adds the Dynamic metadata supplied from the output control unit 102 to each individual picture in the HDR video supplied from the decoding processing unit 56, and outputs the resulting picture to the TV 2.

In step S106, the controller 51 determines whether or not random access playback is to be performed. If it is determined in step S106 that random access playback is not to be performed, that is, if it is determined that normal playback is to be performed, the processing returns to step S105 to continue outputting individual pictures in the HDR video.

On the other hand, if it is determined in step S106 that random access playback is to be performed, the processing goes to step S107. If an instruction to perform fast-forward playback/rewind playback is given by the user, or if an instruction to perform cueing playback is given by the user, it is determined in step S106 that random access playback is to be performed.

In step S107, the decoding processing unit 56 decodes the jump destination picture, which serves as a random access point.

In step S108, the decoding processing unit 56 combines the jump destination picture with an OSD image.

In step S109, the external output unit 58 adds default metadata to the jump destination picture combined with the OSD image and outputs the resulting picture. The default metadata that is output along with the jump destination picture is supplied from the output control unit 102 in the controller 51.

Thereafter, the processing returns to step S106 to repeat the foregoing process steps. For example, in a case where the random access playback indicated by the user is fast-forward playback/rewind playback, first pictures in GOPs are sequentially decoded, and these first pictures in their respective GOPs are output along with default metadata.

—Operations of TV

Figure 29:
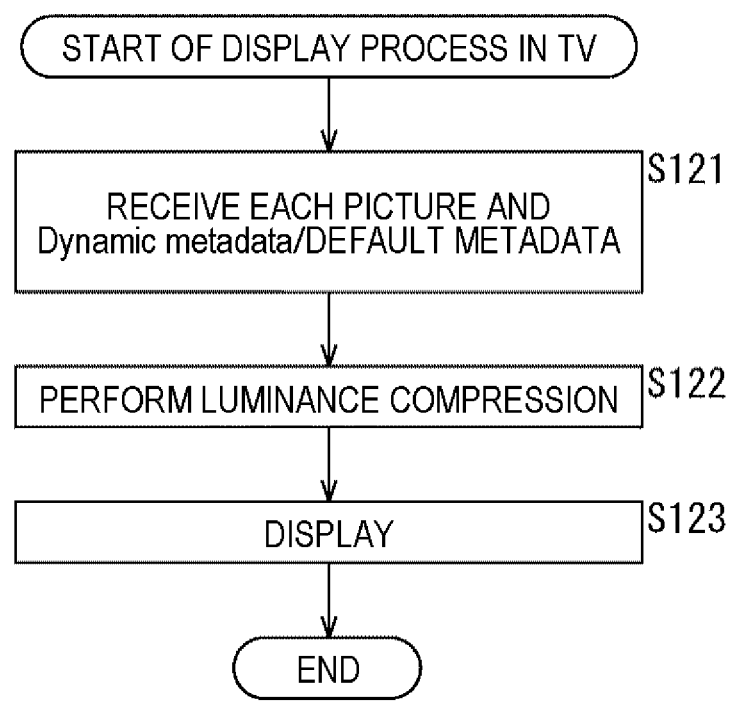
FIG. 29 is a flowchart explaining a display process in a TV.

Next, referring to the flowchart in FIG. 29, the following describes a display process in the TV 2.

The process in FIG. 29 is performed when transmission of the picture obtained by decoding an HDR video stream is started. The picture transmitted from the playback apparatus 1 includes either Dynamic metadata or default metadata added thereto.

In step S121, the external input unit 72 in the TV 2 receives each picture data piece in the HDR video that has been transmitted from the playback apparatus 1, and also receives the Dynamic metadata or the default metadata that is added thereto and that has been transmitted.

If an instruction to perform random access playback is not given, each picture is received along with Dynamic metadata in this step. On the other hand, if an instruction to perform random access playback is given to the playback apparatus 1, a picture combined with an OSD image is received along with default metadata in this step.

Each picture data piece received by the external input unit 72 is supplied to the signal processing unit 73, and the metadata (either Dynamic metadata or default metadata) is supplied to the controller 71.

In step S122, the signal processing unit 73 performs luminance compression on each picture in the HDR video under the control of the controller 71. If the metadata transmitted along with a picture is Dynamic metadata, luminance compression is performed on the basis of the Dynamic metadata. On the other hand, if the metadata transmitted along with a picture is default metadata, luminance compression is performed on the basis of the default metadata.

In step S123, the signal processing unit 73 causes the display 74 to display the picture that has undergone luminance compression. Displaying the HDR video including such sequence of process steps is continued until playback of the HDR content is finished.

As described above, by performing luminance compression in the TV 2 on the basis of default metadata during random access playback, it is made possible to prevent the OSD image combined with each picture from appearing to be blinking.

<Example in which Default Metadata is Used when Jump Destination has No Dynamic Metadata>

Instead of compulsorily using default metadata when random access playback is performed, the default metadata may be used and transmitted to the TV 2 if the jump destination picture has no Dynamic metadata added thereto.

Figure 30:
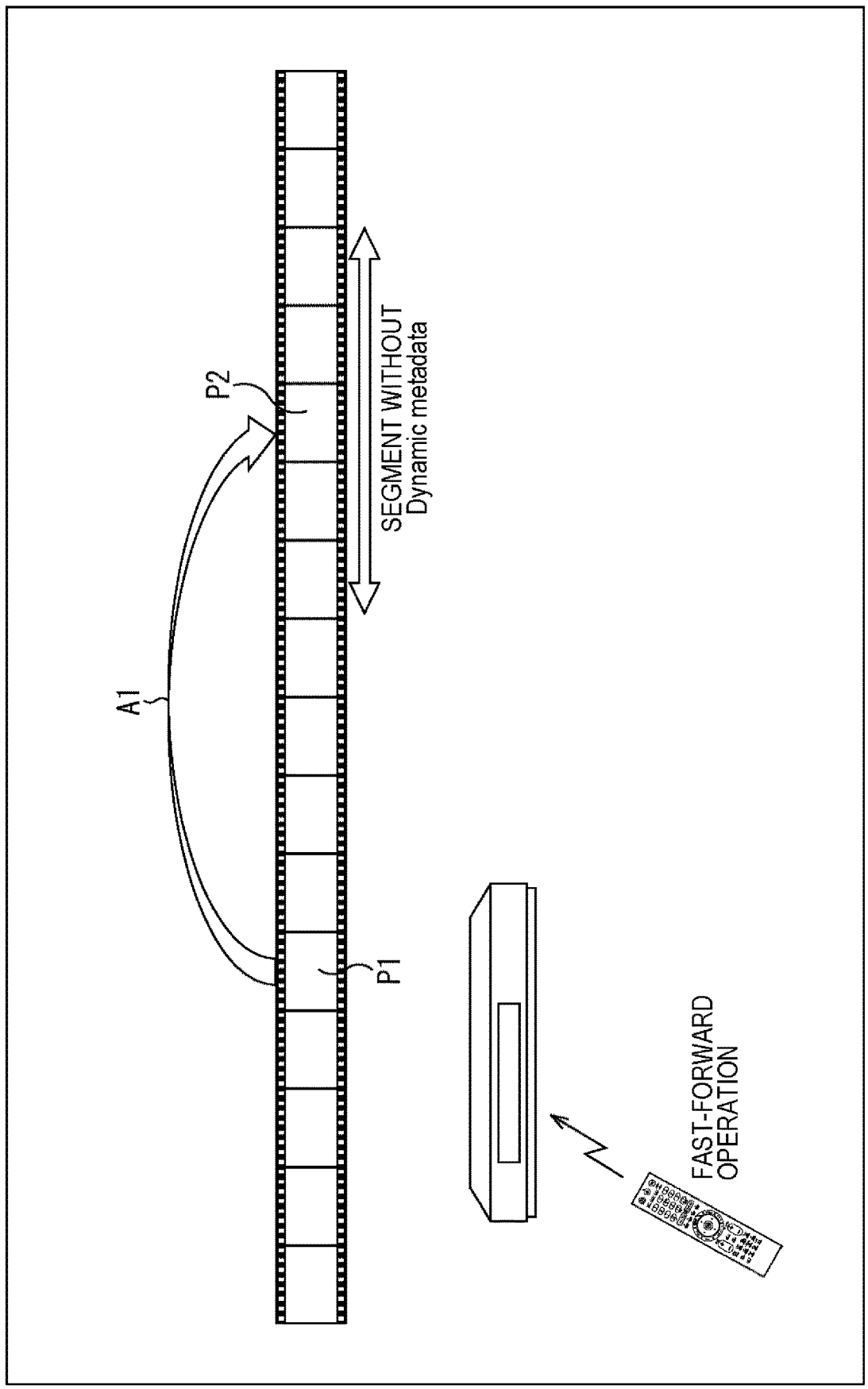
FIG. 30 is a diagram illustrating an example of random access playback.

FIG. 30 is a diagram illustrating an example of random access playback.

As an example, the following describes the case where an instruction to perform cueing playback is given at a time when the picture P1 is about to be played back, and a jump is made from the picture P1 to the picture P2 as indicated by the arrow A1 in FIG. 30.

In this case, the playback apparatus 1 analyzes the picture P2 and detects whether or not Dynamic metadata is added thereto. If the picture P2 is within a section in which no Dynamic metadata is added, default metadata is used and output along with the picture P2.

For example, if Dynamic metadata is added to the picture P2, the Dynamic metadata is output along with the picture P2.

As seen above, Dynamic metadata may be transmitted if the Dynamic metadata is added to the jump destination picture, while default metadata may be transmitted if Dynamic metadata is not added to the jump destination picture.

Figure 31:
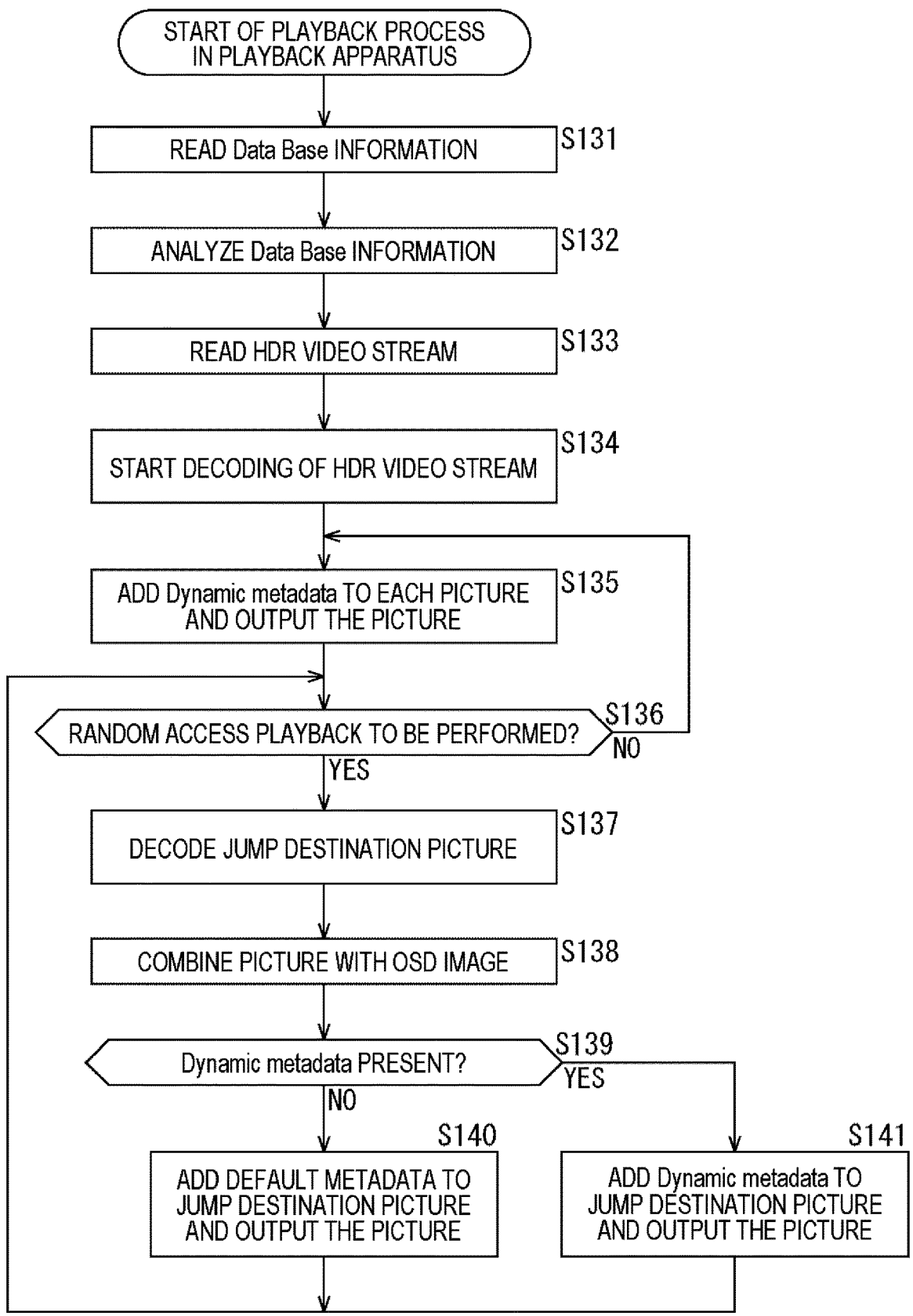
FIG. 31 is a flowchart explaining still another playback process in a playback apparatus.

Now, referring to the flowchart in FIG. 31, the following describes a process in the playback apparatus 1 that plays back HDR content.

The process in FIG. 31 is similar to the process in FIG. 28 except that the metadata to be transmitted to the TV 2 is switched according to whether or not Dynamic metadata is added to the jump destination picture.

Specifically, in steps S131 to S135, HDR content is normally played back as in steps S101 to S105 in FIG. 28.

If it is determined that random access playback is to be performed in step S136, the decoding processing unit 56 decodes the jump destination picture serving as a random access point in step S137.

In step S138, the decoding processing unit 56 combines the jump destination picture with an OSD image.

In step S139, the decoding processing unit 56 determines whether or not Dynamic metadata is added to the jump destination picture.

If it is determined in step S139 that Dynamic metadata is not added thereto, the external output unit 58 adds default metadata to the jump destination picture combined with the OSD image and outputs the resulting picture in step S140.

On the other hand, if it is determined in step S139 that Dynamic metadata is added thereto, the external output unit 58 adds Dynamic metadata to the jump destination picture combined with the OSD image and outputs the resulting picture in step S141.

After the picture is output in step S140 or step S141, the processing returns to step S136 to repeat the foregoing process steps.

In this way, the default metadata may be used only in a case where no Dynamic metadata is added to the jump destination picture, while Dynamic metadata may be transmitted to the TV 2 if the Dynamic metadata is added thereto. Therefore, luminance compression on the jump destination picture can be performed in a manner intended by the producer of the HDR content.

Example Configuration of Playback System

First Example Configuration

Descriptions above have been provided about the case where HDR content is recorded on the optical disc 11. However, the foregoing processes can also be applied to a case where HDR content distributed via a network is played back as described above.

Figure 32:
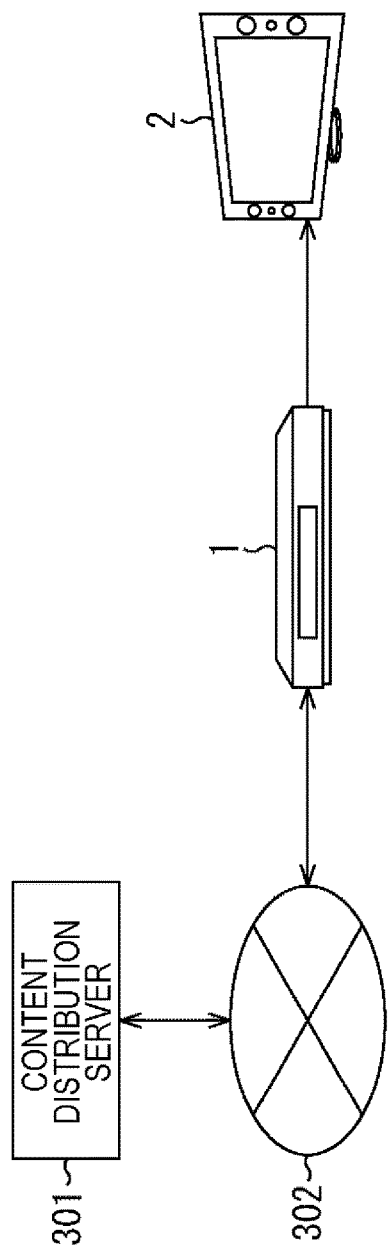
FIG. 32 is a diagram illustrating an example configuration of an HDR content playback system.

FIG. 32 is a diagram illustrating an example configuration of an HDR content playback system.

The playback system in FIG. 32 is configured by connecting the playback apparatus 1 to a content distribution server 301 via a network 302 such as the Internet. The TV 2 is connected to the playback apparatus 1 via an HDMI cable or the like. Video images of the HDR content played back by the playback apparatus 1 are displayed on the TV 2.

The content distribution server 301 is a server managed by a business operator providing HDR content distribution services. The content distributed by the content distribution server 301 is HDR content.

Each HDR content piece is made by associating an HDR video stream file including Dynamic metadata with a playback control information file.

For example, when the user operates the playback apparatus 1 to access the content distribution server 301, an HDR content selection screen is displayed on the TV 2. The user can select a certain HDR content piece and send a request to the content distribution server 301 so that the user can start viewing of the content.

When some HDR content is selected, the content distribution server 301 sends the selected HDR content to the playback apparatus 1.

The playback apparatus 1 receives the HDR content sent from the content distribution server 301 and plays back the HDR content by performing a process similar to the above-described playback process.

In other words, the playback apparatus 1 transmits each individual picture to the TV 2 along with Dynamic metadata, the individual pictures being obtained by decoding HDR video streams, and luminance compression is performed on the basis of the Dynamic metadata.

Furthermore, when an instruction to perform random access playback is given, each picture in the HDR video is transmitted along with the Dynamic metadata that is added to the jump destination picture, and, in the TV 2, luminance compression is performed on the basis of the Dynamic metadata. Dynamic metadata is added to the jump destination picture, which is the first picture of a GOP or the picture specified by EP_map or the like as an entry point.

Moreover, in a case where default metadata is prepared in the playback apparatus 1, in response to an instruction to perform random access playback, the default metadata is transmitted along with the jump destination picture, and, in the TV 2, luminance compression is performed on the basis of the default metadata.

As described above, the content distribution server 301 may distribute the HDR content that includes HDR video streams in which Dynamic metadata is compulsorily added to the first picture of a GOP or to the picture specified as an entry point.

Furthermore, when random access playback of an HDR video stream included in the HDR content distributed by the content distribution server 301 is to be performed, default metadata may be output from the playback apparatus 1 to the TV 2.

Figure 33:
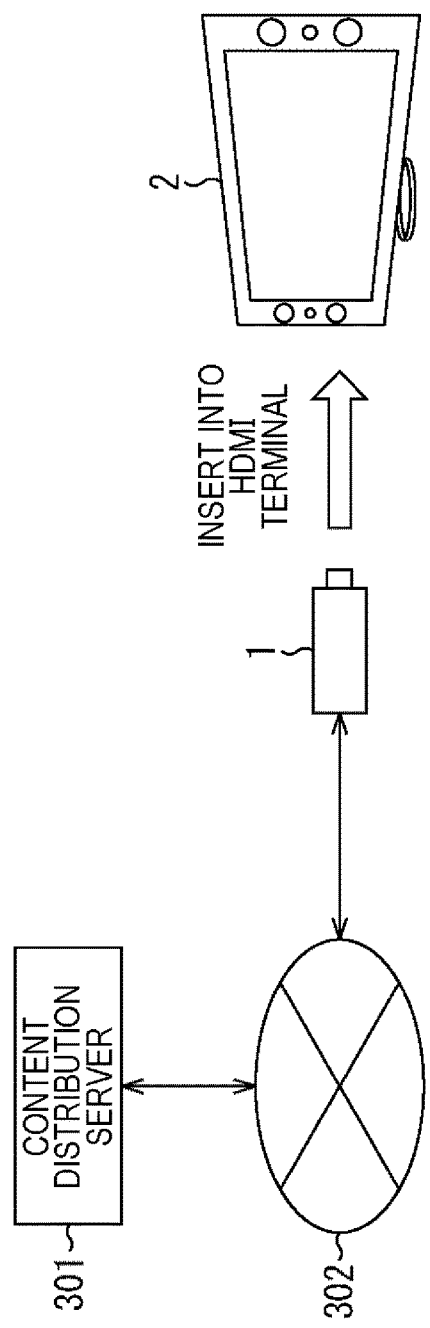
FIG. 33 is a diagram illustrating another example configuration of a playback apparatus.

FIG. 33 is a diagram illustrating another example configuration of the playback apparatus 1.

As illustrated in FIG. 33, the playback apparatus 1 may be a so-called stick type terminal. An HDMI terminal is disposed on the housing of the playback apparatus 1 illustrated in FIG. 33. The HDMI terminal disposed on the housing is inserted into the HDMI terminal on the TV 2, whereby the playback apparatus 1 and the TV 2 are connected.

For example, the playback apparatus 1 in FIG. 33 is in the configuration illustrated in FIG. 15 excluding the disc drive 52. The playback apparatus 1 plays back the HDR content distributed by the content distribution server 301 by performing a process similar to the above-described process.

As described above, a variety of forms can be employed as the form of the playback apparatus 1. For example, functions of the playback apparatus 1 may be provided on a portable terminal such as a smartphone or tablet terminal, or function of the playback apparatus 1 may be provided on a terminal such as a PC.

Second Example Configuration

Functions of the playback apparatus 1 may be provided on the TV 2.

Figure 34:
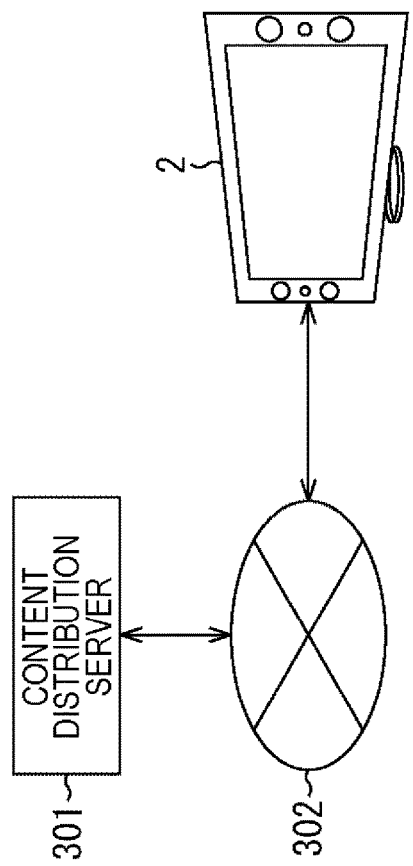
FIG. 34 is a diagram illustrating an example configuration of another HDR content playback system.

FIG. 34 is a diagram illustrating an example configuration of another HDR content playback system.

The playback system in FIG. 34 is configured by connecting the TV 2 on which functions of the playback apparatus 1 are provided and the content distribution server 301 via the network 302. Duplicate descriptions are omitted as appropriate.

The TV 2 displays an HDR content selection screen on the basis of the information sent from the content distribution server 301.

When a certain HDR content piece is selected by the user, the content distribution server 301 sends the selected HDR content to the TV 2.

The TV 2 receives the HDR content sent from the content distribution server 301 and plays back the HDR content.

That is, the TV 2 performs luminance compression on each picture in the HDR video on the basis of Dynamic metadata.

Furthermore, when an instruction to perform random access playback is given, luminance compression is performed on the jump destination picture on the basis of the Dynamic metadata added to the jump destination picture.

Moreover, in a case where default metadata is prepared in the TV 2, when an instruction to perform random access playback is given, luminance compression is performed on the jump destination picture on the basis of the default metadata.

As seen above, functions of the playback apparatus 1 may be provided on the TV 2, and the process as described above may be performed in the TV 2.

Other Examples

The foregoing assumes that the recording medium for HDR content is an optical disc, but the recording medium may be another recording medium such as a flash memory.

The foregoing assumes that the process performed on a video on the basis of Dynamic metadata or default metadata is luminance compression, but luminance expansion may be performed in the TV 2. In this case, Dynamic metadata or default metadata contains descriptions about tone curve information used for luminance expansion.

The foregoing assumes that video streams to be input to the playback apparatus 1 are the video streams encoded by a predetermined method, but the video streams that include pictures to which Dynamic metadata is added and that are not encoded may be input to the playback apparatus 1.

<Example Configuration of Computer>

The aforementioned series of process steps can be executed by hardware or executed by software. In a case where the series of process steps is to be executed by software, programs included in the software are installed from a program recording medium onto a computer incorporated into special-purpose hardware, a general-purpose computer, or the like.

Figure 35:
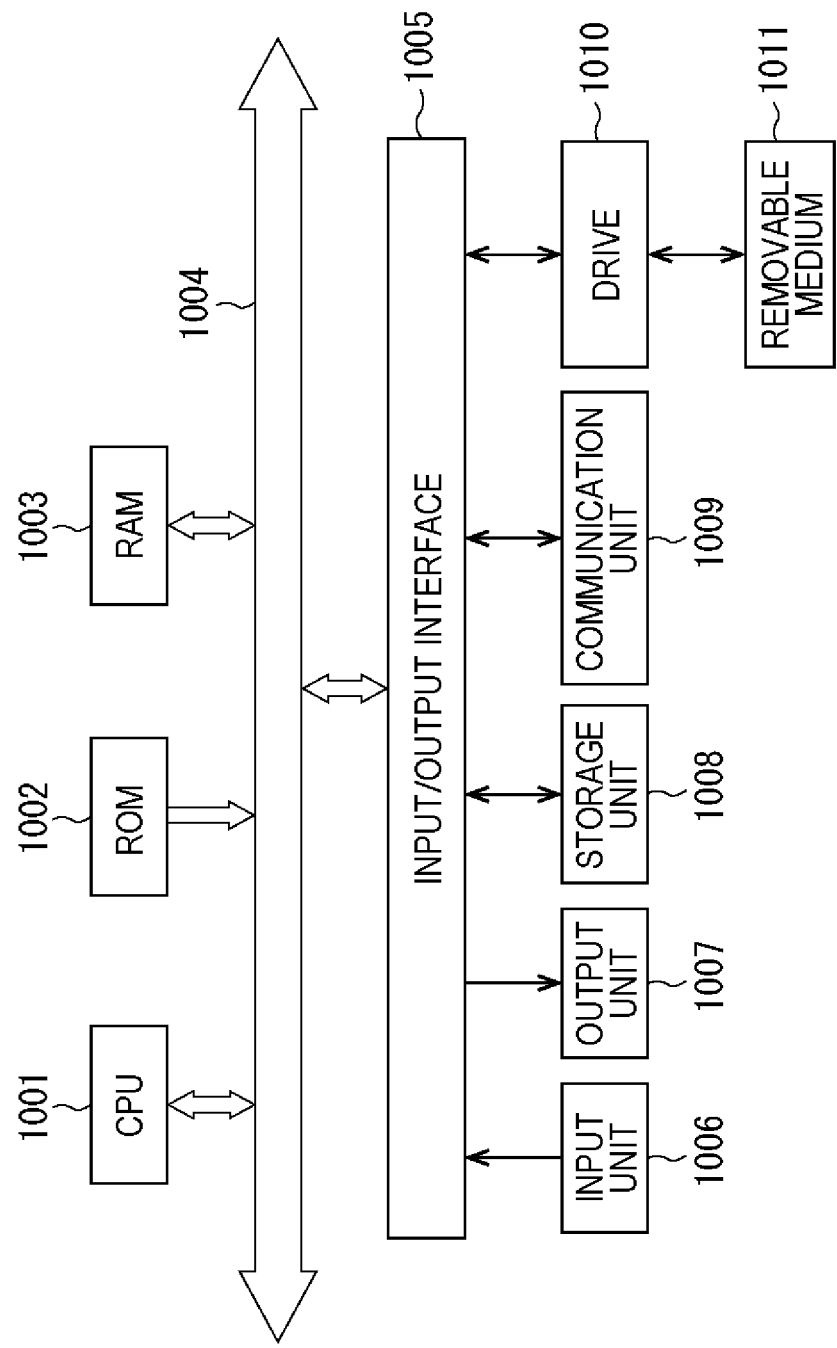
FIG. 35 is a block diagram illustrating an example configuration of a computer.

FIG. 35 is a block diagram illustrating an example hardware configuration of a computer in which the aforementioned series of process step is executed by programs.

A central processing unit (CPU) 1001, a read only memory (ROM) 1002, and a random access memory (RAM) 1003 are connected to one another by a bus 1004.

Moreover, an input/output interface 1005 is connected to the bus 1004. To the input/output interface 1005, an input unit 1006 including a keyboard, a mouse, or the like and an output unit 1007 including a display, a speaker, or the like are connected. Furthermore, to the input/output interface 1005, a storage unit 1008 including a hard disc, a non-volatile memory, or the like, a communication unit 1009 including a network interface or the like, and a drive 1010 that drives a removable medium 1011 are connected.

In the computer configured as above, the CPU 1001 performs the aforementioned series of process steps by, for example, loading a program stored in the storage unit 1008 into the RAM 1003 via the input/output interface 1005 and the bus 1004 and executing the program.

Programs to be executed by the CPU 1001 are recorded on, for example, the removable medium 1011 or provided via a wired or wireless transmission medium such as a local area network, the Internet, or digital broadcasting, and installed on the storage unit 1008.

Note that the programs executed by the computer may be programs for process steps to be performed in time series in the order described herein, or may be programs for process steps to be performed in parallel or on an as-needed basis when, for example, a call is made.

Embodiments of the present technology are not limited to the above-described embodiments, and various modifications can be made thereto to the extent not departing from the gist of the present technology.

For example, the present technology can be in a cloud computing configuration in which one function is distributed among, and handled in collaboration by, a plurality of apparatuses via a network.

Furthermore, each of the steps described above with reference to the flowcharts can be executed not only by one apparatus but also by a plurality of apparatuses in a shared manner.

Moreover, in a case where one step includes a plurality of processes, the plurality of processes included in the one step can be executed not only by one apparatus but also by a plurality of apparatuses in a shared manner.

A system herein means a set of a plurality of components (apparatuses, modules (parts), and the like) regardless of whether or not all the components are within the same housing. Therefore, either of a plurality of apparatuses contained in separate housings and connected via a network and one apparatus in which a plurality of modules is contained in one housing is a system.

The effects described herein are examples only and are not restrictive, and other effects may be provided.

<Examples of Configuration Combination>

The present technology can be in any of the following configurations.

(1)

An information processing apparatus including:

a generation unit that generates dynamic metadata including information regarding luminance of a picture; and an encoding unit that encodes HDR video data such that the dynamic metadata is added to each picture serving as a random access point.

(2)

The information processing apparatus according to (1), in which the encoding unit adds the dynamic metadata to a first picture of a GOP as the picture serving as the random access point.

(3)

The information processing apparatus according to (1), further including:

a generation unit that generates playback control information including information specifying the random access point, the playback control information being used for playing back a video stream obtained by the encoding, in which the encoding unit adds the dynamic metadata to the picture serving as the random access point specified by the information included in the playback control information.

(4)

The information processing apparatus according to (3), in which the information specifying the random access points is EP_map included in Clip Information, the Clip Information being defined by a Blu-ray Disc format and serving as the playback control information, and the encoding unit adds the dynamic metadata to each picture serving as an entry point specified in the EP_map as the random access point.

(5)

The information processing apparatus according to (3), in which the information specifying the random access point is Movie Fragment Random Access Box, the Movie Fragment Random Access Box being defined by an MP4 format and serving as the playback control information, and the encoding unit adds the dynamic metadata to each picture serving as the random access point specified by the Movie Fragment Random Access Box.

(6)

An information processing method, in which an information processing apparatus generates dynamic metadata including information regarding luminance of a picture, and encodes HDR video data such that the dynamic metadata is added to each picture serving as a random access point.

(7)

A program configured to cause a computer to execute processes of:

generating dynamic metadata including information regarding luminance of a picture; and encoding HDR video data such that the dynamic metadata is added to each picture serving as a random access point.

(8)

A recording medium, in which a video stream generated by encoding HDR video data such that dynamic metadata including luminance information is added to each picture serving as a random access point is recorded.

(9)

A playback apparatus including:

a playback unit that performs random access playback of a video stream generated by encoding HDR video data such that dynamic metadata including luminance information is added to each picture serving as a random access point; and an output control unit that outputs the picture serving as the random access point to a display apparatus along with the dynamic metadata.

(10)

A playback apparatus including:

a playback unit that performs random access playback of a video stream to which dynamic metadata including information regarding luminance of a picture is added; and an output control unit that, in a case where predetermined information indicating that random access playback is being performed is to be superimposed on the picture and displayed, adds metadata to be used during random access playback for luminance adjustment during the random access playback to the picture serving as a random access point, and outputs the picture to which the metadata to be used during the random access playback is added to a display apparatus.

(11)

The playback apparatus according to (10), in which the playback unit performs, as the random access playback, fast-forward playback or rewind playback at x-fold speed, where x is a predetermined number.

(12)

The playback apparatus according to (10) or (11), in which the playback unit performs cueing playback as the random access playback.

(13)

A playback method, in which a playback apparatus performs random access playback of a video stream to which dynamic metadata including information regarding luminance of a picture is added, in a case where predetermined information indicating that random access playback is being performed is to be superimposed on the picture and displayed, adds metadata to be used during random access playback for luminance adjustment during the random access playback to the picture serving as a random access point, and outputs the picture to which the metadata to be used during the random access playback is added to a display apparatus.

(14)

A program configured to cause a computer to execute processes of:

performing random access playback of a video stream to which dynamic metadata including information regarding luminance of a picture is added;

in a case where predetermined information indicating that random access playback is being performed is to be superimposed on the picture and displayed, adding metadata to be used during random access playback for luminance adjustment during the random access playback to the picture serving as a random access point; and outputting the picture to which the metadata to be used during the random access playback is added to a display apparatus.

REFERENCE SIGNS LIST

1 Playback apparatus
2 TV
3 Recording apparatus
21 Controller
22 Encoding processing unit
23 Disc drive
31 Dynamic metadata generation unit
32 Encoding control unit
33 Data Base information generation unit
34 Recording control unit
51 Controller
52 Disc drive
53 Memory
54 Local storage
55 Communication unit
56 Decoding processing unit
57 Operation input unit
58 External output unit
101 Data Base information analysis unit
102 Output control unit
103 Default metadata generation unit

The invention claimed is:

1. An information processing apparatus comprising:
   a generation unit configured to generate dynamic metadata including information regarding luminance of a picture; and
   an encoding unit configured to encode high dynamic range (HDR) video data such that the dynamic metadata is added to each picture serving as a random access point,
   wherein, in a case where predetermined information indicating that random access playback is being performed is to be superimposed on the picture and displayed, the dynamic metadata is used for adding metadata to be used during random access playback for luminance adjustment during the random access playback to the picture serving as a random access point, and
   wherein the generation unit and the encoding unit are each implemented via at least one processor.

2. The information processing apparatus according to claim 1, wherein
   the encoding unit is further configured to add the dynamic metadata to a first picture of a group of pictures (GOP) as the picture serving as the random access point.

3. The information processing apparatus according to claim 1, further comprising:
   a generation unit configured to generate playback control information including information specifying the random access point, the playback control information being used for playing back a video stream obtained by the encoding, wherein
   the encoding unit is further configured to add the dynamic metadata to the picture serving as the random access point specified by the information included in the playback control information.

4. The information processing apparatus according to claim 3, wherein
   the information specifying the random access point is EndPoint Mapper (EP_map) included in Clip Information, the Clip Information being defined by an optical disc storage format and serving as the playback control information, and
   the encoding unit is further configured to add the dynamic metadata to each picture serving as an entry point specified in the EP_map as the random access point.

5. The information processing apparatus according to claim 3, wherein
   the information specifying the random access point is Movie Fragment Random Access Box, the Movie Fragment Random Access Box being defined by an MP4 format and serving as the playback control information, and the encoding unit is further configured to add the dynamic metadata to each picture serving as the random access point specified by the Movie Fragment Random Access Box.

6. An information processing method comprising:
generating dynamic metadata including information regarding luminance of a picture; and
encoding high dynamic range (HDR) video data such that the dynamic metadata is added to each picture serving as a random access point,
wherein, in a case where predetermined information indicating that random access playback is being performed is to be superimposed on the picture and displayed, the dynamic metadata is used for adding metadata to be used during random access playback for luminance adjustment during the random access playback to the picture serving as a random access point.

7. A non-transitory computer-readable medium having embodied thereon a program, which when executed by a computer causes the computer to execute an information processing method, the method comprising:
generating dynamic metadata including information regarding luminance of a picture; and
encoding high dynamic range (HDR) video data such that the dynamic metadata is added to each picture serving as a random access point,
wherein, in a case where predetermined information indicating that random access playback is being performed is to be superimposed on the picture and displayed, the dynamic metadata is used for adding metadata to be used during random access playback for luminance adjustment during the random access playback to the picture serving as a random access point.

8. A non-transitory computer-readable recording medium, wherein
a video stream generated by encoding high dynamic range (HDR) video data such that dynamic metadata including luminance information is added to each picture serving as a random access point is recorded, and
wherein, in a case where predetermined information indicating that random access playback is being performed is to be superimposed on the picture and displayed, the dynamic metadata is used for adding metadata to be used during random access playback for luminance adjustment during the random access playback to the picture serving as a random access point.

9. A playback apparatus comprising:
a playback unit configured to perform random access playback of a video stream generated by encoding high dynamic range (HDR) video data such that dynamic metadata including luminance information is added to each picture serving as a random access point; and
an output control unit configured to output the picture serving as the random access point to a display apparatus along with the dynamic metadata,
wherein, in a case where predetermined information indicating that random access playback is being performed is to be superimposed on the picture and displayed, the dynamic metadata is used for adding metadata to be used during random access playback for luminance adjustment during the random access playback to the picture serving as a random access point, and
wherein the playback unit and the output control unit are each implemented via at least one processor.

10. A playback apparatus comprising:
a playback unit configured to perform random access playback of a video stream to which dynamic metadata including information regarding luminance of a picture is added; and
an output control unit configured to, in a case where predetermined information indicating that random access playback is being performed is to be superimposed on the picture and displayed, add metadata to be used during random access playback for luminance adjustment during the random access playback to the picture serving as a random access point, and output the picture to which the metadata to be used during the random access playback is added to a display apparatus.

11. The playback apparatus according to claim 10, wherein
the playback unit is further configured to perform, as the random access playback, fast-forward playback or rewind playback at x-fold speed, where x is a predetermined number.

12. The playback apparatus according to claim 10, wherein
the playback unit is further configured to perform cueing playback as the random access playback.

13. A playback method comprising:
performing random access playback of a video stream to which dynamic metadata including information regarding luminance of a picture is added;
in a case where predetermined information indicating that random access playback is being performed is to be superimposed on the picture and displayed, adding metadata to be used during random access playback for luminance adjustment during the random access playback to the picture serving as a random access point; and
outputting the picture to which the metadata to be used during the random access playback is added to a display apparatus.

14. A non-transitory computer-readable medium having embodied thereon a program, which when executed by a computer causes the computer to execute a playback method, the method comprising:
performing random access playback of a video stream to which dynamic metadata including information regarding luminance of a picture is added;
in a case where predetermined information indicating that random access playback is being performed is to be superimposed on the picture and displayed, adding metadata to be used during random access playback for luminance adjustment during the random access playback to the picture serving as a random access point; and
outputting the picture to which the metadata to be used during the random access playback is added to a display apparatus.

* * * * *